United States Patent [19]

Yamada et al.

[11] Patent Number: 5,751,382
[45] Date of Patent: May 12, 1998

[54] LIQUID CRYSTAL DISPLAY INPUT/OUTPUT DEVICE

[75] Inventors: Nobuaki Yamada, Higashiosaka; Masahiko Kondo, Kitakatsuragi; Masayuki Okamoto, Tenri; Shuichi Kozaki, Nara, all of Japan

[73] Assignee: Sharp Kabushiki Kaisha, Osaka, Japan

[21] Appl. No.: 450,185

[22] Filed: May 25, 1995

Related U.S. Application Data

[60] Division of Ser. No. 324,976, Oct. 18, 1994, which is a continuation-in-part of Ser. No. 054,454, Apr. 21, 1993, Pat. No. 5,473,450.

[30] Foreign Application Priority Data

| Oct. 19, 1993 | [JP] | Japan | 5-261356 |
| Oct. 27, 1993 | [JP] | Japan | 5-268612 |
| Jul. 25, 1994 | [JP] | Japan | 6-172740 |

[51] Int. Cl.⁶ .................. G02F 1/133; G02F 1/1339; G02F 1/1343; G09G 3/36
[52] U.S. Cl. .................. 349/12; 349/156; 349/162; 349/139; 345/104
[58] Field of Search .................. 359/54, 55, 51, 359/52, 85; 345/104, 173; 178/19, 18; 349/12, 155, 156, 139, 143, 162, 128, 129

[56] References Cited

U.S. PATENT DOCUMENTS

| 3,863,332 | 2/1975 | Leupp et al. | 349/158 |
| 4,579,423 | 4/1986 | Fergason | 350/334 |
| 4,671,618 | 6/1987 | Wu et al. | 350/347 V |
| 4,744,639 | 5/1988 | Tsuboyama | 350/350 S |
| 4,815,826 | 3/1989 | Fergason | 350/339 F |
| 4,890,902 | 1/1990 | Doane et al. | 350/347 V |
| 5,005,951 | 4/1991 | Te Velde | 359/81 |
| 5,089,904 | 2/1992 | Fergason | 359/52 |
| 5,103,326 | 4/1992 | Fergason | 359/51 |

(List continued on next page.)

FOREIGN PATENT DOCUMENTS

| 0 278 721 A2 | 8/1988 | European Pat. Off. . |
| 56-077 884 | 6/1981 | Japan . |
| 58-501 631 | 9/1983 | Japan . |
| 59-119 320 | 7/1984 | Japan . |

(List continued on next page.)

OTHER PUBLICATIONS

Patent Abtracts of Japan, vol. 12, No. 243, p. 728, Jul. '88, abstracting JP 63–036224–A of Feb. '88.
Patents Abtracts of Japan, vol. 13, No. 382, p. 923, Aug. '89, abtracting JP 1–134336–A of May '89.
Patents Abstracts of Japan, vol. 16, No. 216, p. 1356, May '92, abstracting JP 4–040424–A of Feb. '92.
T. Tagawa et al., "LCD Panel with a Function of Detecting Pen Positions," Sharp Technical Journal, vol. 56, pp. 15–18, Jun. 1993.

*Primary Examiner*—Anita Pellman Gross
*Assistant Examiner*—Tai V. Duong
*Attorney, Agent, or Firm*—David G. Conlin, Esq.

[57] ABSTRACT

The present invention provides a liquid crystal display device including a pair of electrode substrates and a display medium sandwiched between the electrode substrates and including a polymeric wall and liquid crystal regions at least partly surrounded by the polymeric wall. In this liquid crystal display device, the polymeric wall is tightly attached to both the electrode substrates. Furthermore, the invention also provides a method for producing a liquid crystal display device including a pair of electrode substrates, at least one of which is transparent, and a display medium including a polymeric wall and liquid crystal regions at least partly surrounded by the polymeric wall and sandwiched between the electrode substrates. This method includes the steps of injecting a mixture including liquid crystal and a photopolymerizable material between the electrode substrates; and irradiating the mixture with light having light intensity distribution so as to cause phase-separation between the liquid crystal and the photopolymerizable material, thereby forming the liquid crystal regions in weakly irradiated areas.

7 Claims, 16 Drawing Sheets

U.S. PATENT DOCUMENTS

| | | | |
|---|---|---|---|
| 5,194,852 | 3/1993 | More et al. | 178/19 |
| 5,280,375 | 1/1994 | Tsuda et al. | 349/128 |
| 5,333,074 | 7/1994 | Hikmet | 359/51 |
| 5,379,139 | 1/1995 | Sato et al. | 359/81 |
| 5,442,373 | 8/1995 | Nomura et al. | 345/104 |
| 5,450,220 | 9/1995 | Onishi et al. | 359/51 |
| 5,473,450 | 12/1995 | Yamada et al. | 359/51 |

FOREIGN PATENT DOCUMENTS

| | | |
|---|---|---|
| 59-226322 | 12/1984 | Japan . |
| 61-502 128 | 9/1986 | Japan . |
| 63-036224-A | 2/1988 | Japan . |
| 1-134336-A | 5/1989 | Japan . |
| 63-096 857 | 10/1989 | Japan . |
| 2-099 920 | 4/1990 | Japan . |
| 2-153 318 | 6/1990 | Japan . |
| 2-153 319 | 6/1990 | Japan . |
| 3-061 925 | 3/1991 | Japan . |
| 3-278 024 | 12/1991 | Japan . |
| 4-031 823 | 2/1992 | Japan . |
| 4-031 824 | 2/1992 | Japan . |
| 4-040424-A | 2/1992 | Japan . |
| 4-097 121 | 3/1992 | Japan . |
| 0 497 619 A2 | 8/1992 | Japan . |
| 4-212 928 | 8/1992 | Japan . |
| 4-289 818 | 10/1992 | Japan . |
| 4-323 616 | 11/1992 | Japan . |
| 4-338 923 | 11/1992 | Japan . |
| 5-011 237 | 1/1993 | Japan . |
| 5-027 242 | 2/1993 | Japan . |
| 5-053 726 | 3/1993 | Japan . |
| 5-257 135 | 10/1993 | Japan . |
| 0 568 355 A2 | 11/1993 | Japan . |

UV rays
(On producing a cell)

Absorption curve : (2.5 mg / 500 ml MeOH, 1cm cell)

UV rays
(On producing a cell)

LIQUID CRYSTAL DISPLAY INPUT/OUTPUT DEVICE

This is a divisional of application Ser. No. 08/324,976 filed on Oct. 18, 1994 which is a continuation-in-part of commonly-owned U.S. application Ser. No. 08/054,454, YAMADA et al, filed Apr. 27, 1993 now U.S. Pat. No. 5,473,450.

BACKGROUND OF THE INVENTION

1. Field of the Invention

The present invention relates to a liquid crystal display device, in which a display medium including liquid crystal regions surrounded by a polymeric wall and sandwiched between a pair of opposing substrates, applicable to a plane display device such as a personal computer, a liquid crystal television set, a portable display including a film substrate, and a display apparatus in which a display portion and an input portion are integrated for adopting a pen entry operation.

2. Description of the Related Art

Conventional liquid crystal display devices utilize a variety of display modes as follows: As liquid crystal display devices utilizing an electrooptic effect, a twisted nematic (TN) liquid crystal display device and a super-twisted nematic (STN) liquid crystal display device using nematic liquid crystal have been put to practical use (Japanese Laid-Open Patent Publication No. 59-119320). Further, as an STN liquid crystal display device achieving a brighter display, a reflective type liquid crystal display device including one polarizing plate is proposed (Japanese Laid-Open Patent Publication Nos. 4-97121 and 4-289818).

As liquid crystal display devices utilizing light scattering of liquid crystal without using a polarizing plate, those utilizing a dynamic scattering (DS) effect and a phase change (PC) effect have been proposed.

Recently, as a liquid crystal display device requiring neither a polarizing plate nor an alignment treatment, a display device utilizing the birefringence of liquid crystal so as to electrically control the transparent state and the opaque state has been proposed. In such a liquid crystal display device, the refractive index of the liquid crystal molecule with respect to ordinary light is basically matched with the refractive index of a polymeric material supporting the liquid crystal. As a result, the transparent state is displayed when a voltage is applied to uniformly orient the liquid crystal molecules, and the opaque state Is displayed under application of no voltage because of light scattering caused by the turbulence of the liquid crystal molecules. It is disclosed that such a liquid crystal display device is produced by using a mixture of a photosensitive or thermosetting material and liquid crystal, from which the photosensitive or thermosetting material alone is deposited by polymerization, thereby forming a liquid crystal droplet surrounded by the polymeric material (resin) (Japanese National Publication No. 61-502128).

As another type of a liquid crystal display device, a non-scattering type liquid crystal device having viewing angle characteristics improved by using a polarizing plate, is also proposed (Japanese Laid-Open Patent Publication No. 5-27242). This liquid crystal display device is produced by causing phase-separation in a mixture of liquid crystal and a photopolymerizable material to obtain a complex material for liquid crystal domain and a polymeric wall. The thus formed polymeric wall causes random alignment of the resultant liquid crystal domains, and hence, the liquid crystal molecules in the respective liquid crystal domains rise in different directions. As a result, the apparent refractive index is constant when seen from any direction, and thus, the viewing angle characteristics at halftone are improved.

As a similar liquid crystal display device, the Applicant has proposed the following device (Japanese Patent Application No. 4-286487): In producing this liquid crystal display device, light control means such as a photomask is used in light irradiation to cause photopolymerization in a mixture of liquid crystal, a photopolymerizable material and the like, thereby forming liquid crystal domains omnidirectionally, i.e., radially, oriented in a pixel region. Accordingly, the liquid crystal molecules are moved in such a manner that an umbrella is opened or closed by controlling a voltage to be applied. This liquid crystal display device has further improved viewing angle characteristics.

In the liquid crystal region in the abovementioned conventional liquid crystal display device, the liquid crystal is aligned by using an alignment regulating force on a substrate. Since the polymeric wall is an isotropic phase, however, its color is different from that of the liquid crystal region, resulting in decreasing the brightness in displaying white. This problem is particularly severe in the reflective type liquid crystal display device for the following reason: When the reflective type liquid crystal display device includes a non-pixel portion formed from a material of the isotropic phase, the isotropic phase between the polarizing plates is in the similar state as that for displaying black. Therefore, the display obtained by such a reflective type liquid crystal display device is generally dark.

Japanese Laid-Open Patent Publication No. 4-323616 discloses a method for producing a liquid crystal display device in which partitions are previously formed on a substrate to be used for manufacturing a cell and liquid crystal is injected into the cell. In this production method, however, the alignment direction between the partition and the liquid crystal is different from the alignment direction by an alignment film on the substrate. Therefore, the alignment direction of the liquid crystal is disordered in the vicinity of the partition, resulting in decreasing the contrast. Moreover, since the partitions are formed on the substrate and then a counter substrate is attached to the substrate, there is no material between the substrates to attach them to each other, resulting in decreasing the physical strength of the cell. Furthermore, since an alignment treatment is conducted on the alignment film on the substrate before forming the partition on the substrate by photolithography or the like, the alignment regulating force on the substrate is weaken, and hence it is impossible to obtain excellent display characteristics. In addition, it is difficult to adjust the height (in the direction vertical to the surfaces of the substrates) of the partitions on the substrate, and a spacer is additionally used to obtain the desired thickness of the cell. Therefore, the thickness of the cell is varied depending upon whether or not the spacer is positioned on the partition, resulting in difficulty in controlling the thickness of the cell accurately.

In such a conventional liquid crystal device, the thickness of a liquid crystal layer, i.e., the so-called cell thickness, is varied with ease by an external pressure. Therefore, when the liquid crystal display device adopts a pen entry operation, the pen entry causes local display irregularity. Therefore, in order to avoid this irregularity, it is necessary to provide a protection film (a protection substrate) or the like over the liquid crystal display device. The use of the protection film or the like leads to a larger distance between the display portion and the pen entry portion, and this distance causes a parallax, causing a difficulty in the operation.

In a liquid crystal display device having improved wide viewing angle characteristics, a sufficient duty ratio cannot be obtained because of the lack of the sharpness in the electro-optical characteristics. Therefore, it is necessary to use an expensive thin film transistor (TFT), resulting in a high production cost.

SUMMARY OF THE INVENTION

The liquid crystal display device of this invention comprises a pair of electrode substrates; and a display medium sandwiched between the electrode substrates and including a polymeric wall and liquid crystal regions at least partly surrounded by the polymeric wall. In this device, the polymeric wall is tightly attached to both the electrode substrates.

In one embodiment, a material to be used for forming the polymeric wall includes polymeric liquid crystal.

In one embodiment, liquid crystal contained in the liquid crystal regions is nematic liquid crystal having a positive dielectric constant anisotropy and including a material having an optical activity, and an angle between alignment directions in the liquid crystal regions in a vicinity of the respective electrode substrates is 220° or more and 290° or less.

In one embodiment, one of the electrode substrates is provided with a polarizer on an outer surface thereof not facing the display medium, the other electrode substrate is provided with a reflecting plate, and the electrode substrate between the display medium and the polarizer has a retardation film.

In one embodiment, the liquid crystal regions have a retardation of 500 nm through 800 nm.

In one embodiment, the electrode substrate having the retardation film has a retardation of 150 nm through 380 nm.

In one embodiment, the liquid crystal display device further comprises a color filter.

In one embodiment, one of the electrode substrates has a film with a reflecting function, and at least part of the film transmits light.

In one embodiment, the liquid crystal regions have a smectic phase and a nematic phase.

This invention also provides a method for producing a liquid crystal display device including a pair of electrode substrates, at least one of which is transparent, and a display medium including a polymeric wall and liquid crystal regions at least partly surrounded by the polymeric wall and sandwiched between the electrode substrates. This method comprises the steps of injecting a mixture including liquid crystal and a photopolymerizable material between the electrode substrates; and irradiating the mixture with light having a light intensity distribution so as to cause phase-separation between the liquid crystal and the photopolymerizable material, thereby forming the liquid crystal regions in weakly irradiated areas.

In one embodiment, the light intensity distribution is provided by using a photomask.

In one embodiment, the mixture is photopolymerized when the liquid crystal is in one of states of an isotropic phase and a nematic phase, and then, the liquid crystal is allowed to be in one of states of a smectic phase and the nematic phase, while causing photopolymerization in the mixture again.

In one embodiment, the step of injecting the mixture is conducted when the liquid crystal is in one of states of an isotropic phase and a nematic phase, and the substrates including the mixture is heated to attain the isotropic phase of the liquid crystal, and then cooled to attain the nematic phase of the liquid crystal before the step of irradiating the mixture.

In one embodiment, light with a wavelength of 350 nm or more is used in the step of irradiating the mixture.

Alternatively, the liquid crystal display device of this invention comprises liquid crystal regions that are formed between a pair of electrode substrates and at least partly surrounded by a polymeric wall formed in a pattern. In this device, the liquid crystal regions and the polymeric wall are aligned in accordance with an alignment regulating force on the electrode substrates under application of no voltage.

In one embodiment, the polymeric wall and the liquid crystal regions include a chiral agent.

In one embodiment, a chiral pitch $P_P$ of the polymeric wall and a chiral pitch $P_{LC}$ of the liquid crystal regions satisfy the following relationship:

$$P_P < 10 \times P_{LC}$$

In one embodiment, refractive index anisotropy $\Delta n_P$ of the polymeric wall and refractive index anisotropy $\Delta n_{LC}$ of the liquid crystal regions satisfy the following relationship:

$$\Delta n_P > (1/10) \times \Delta n_{LC}$$

In one embodiment, the liquid crystal display device further comprises an optical portion formed in a pattern on an inner surface of one of the electrode substrates. The optical portion has a light transmission of 50% or less with regard to light having a wavelength of 250 nm or more and 400 nm or less, and transmits at least 20% or more of light with a wavelength exceeding 400 nm having a maximum value in the light transmission.

Alternatively, the invention provides a method for producing a liquid crystal display device including a pair of electrode substrates at least one of which is transparent, a polymeric wall formed in a pattern between the electrode substrates and liquid crystal regions at least partly surrounded by the polymeric wall. The method comprises the steps of injecting a mixture between the electrodes, the mixture including at least liquid crystal, photopolymerizable liquid crystal including a polymerizable functional group in its molecule and a chiral agent including a polymerizable functional group in its molecule; and irradiating the transparent electrode substrate with light having a regular intensity distribution to cause phase-separation between the liquid crystal and the photopolymerizable liquid crystal through a photopolymerization reaction, thereby forming the polymeric wall including at least part of the chiral agent and the crystal regions.

Alternatively, this invention provides a liquid crystal display input/output device comprising a liquid crystal display device including a polymeric wall formed in a pattern between a pair of electrode substrates and liquid crystal regions at least partly surrounded by the polymeric wall; and input means for detecting a position of a desired point by touching the desired point.

In one embodiment, a plurality of liquid crystal domains are formed in a pixel, and each of the liquid crystal domains includes at least two areas having different alignment directions from each other.

In one embodiment, the liquid crystal display device is one of a TN mode, an STN mode and an FLC mode.

In one embodiment, the polymeric wall is tightly attached to the electrode substrates.

In one embodiment, electrodes on the electrode substrates in the liquid crystal display device work as an input detection electrode in a liquid crystal display integrated tablet.

In one embodiment, the input means adopts one of an electromagnetic induction system, an electrostatic induction system and a pressure sensitive system.

In producing the present liquid crystal display device, a mixture of liquid crystal and a photopolymerizable material is injected between a pair of electrode substrates, and the mixture is irradiated with light so that a portion of the mixture where a liquid crystal region is to be formed be weakly irradiated.

As a result, a reaction is caused first in the components in the photopolymerizable material (i.e., photopolymerizable liquid crystal and a polymerizable compound(s)) that is strongly irradiated to form a core for a polymeric wall. Then, since the concentration of the polymerizable compound is decreased in this strongly irradiated area to cause a concentration gradient, an unreacted part of the polymerizable compound present in the weakly irradiated area is collected in the strongly irradiated area in accordance with the concentration gradient and is polymerized there. Thus, the polymeric wall is formed so as to be in contact with the pair of electrode substrates. Liquid crystal regions are formed in an area where no polymeric wall is formed.

Since the polymeric wall is tightly attached to the electrode substrates in this manner, the cell thickness is little varied even when an external pressure is applied to the electrode substrates.

Moreover, by adopting the above-mentioned configuration, a non-pixel portion, which is an isotropic phase in a conventional device, is aligned in the same manner as in the liquid crystal regions, namely, components in the polymeric wall are allowed to have a birefringent characteristic in the same alignment state as that of the liquid crystal regions. Accordingly, the light transmission is approximately the same in the liquid crystal regions and in the polymeric wall. As a result, the non-pixel portion is bright under application of no voltage, and particularly in a reflective type liquid crystal display device, the display is generally bright. Moreover, since the polymeric wall for surrounding the liquid crystal regions is formed by causing phase-separation between the liquid crystal and the polymerizable material between the electrode substrates, the attachment of the polymeric wall to the electrode substrates is stronger than in the conventional liquid crystal display device produced by previously forming a polymeric wall (partition) on one of the substrates. Accordingly, it is possible to provide a supporting force against an external pressure applied by the pen entry or the like, resulting in preventing display irregularity caused by the variation in the cell thickness due to an external pressure. Therefore, the present liquid crystal display device is applicable to a pen entry type display device having a pen detective keyboard.

Moreover, when a chiral agent is provided to the polymeric wall and the liquid crystal regions so that one of the following relationships is satisfied, the brightness under application of no voltage is effectively improved: $P_P < 10 \times P_{LC}$, wherein $P_P$ is a chiral pitch of the polymeric wall and $P_{LC}$ is a chiral pitch of the liquid crystal region; and $\Delta n_P > (1/10) \times \Delta n_{LC}$, wherein $\Delta n_P$ is index refraction anisotropy of the polymeric wall and $\Delta n_{LC}$ is index refraction anisotropy of the liquid crystal region.

Further, when an optical portion such as a photomask is provided within the liquid crystal display device, the distance between the display medium and the optical portion becomes smaller by the thickness of the substrate than in a device having a photomask on the outer surface of the substrate. As a result, the polymeric wall is prevented from being formed in a pixel due to light diffraction. This results not only in greater brightness in the pixel but also in simplification of the production procedure because the photomask is not required to be provided. Moreover, when the light transmission of the optical portion is controlled by varying the thickness thereof or the like, the liquid crystal is more excellently phase separated from the polymerizable material, resulting in forming well separated liquid crystal regions and polymeric walls.

Thus, the invention described herein makes possible the advantages of providing a liquid crystal display device in which the cell thickness is little varied by an external pressure, and a production method for the same.

These and other advantages of the present invention will become apparent to those skilled in the art upon reading and understanding the following detailed description with reference to the accompanying figures.

DESCRIPTION OF THE PREFERRED EMBODIMENTS

The present invention will now be described by way of examples.

Example 1

Figure 1:
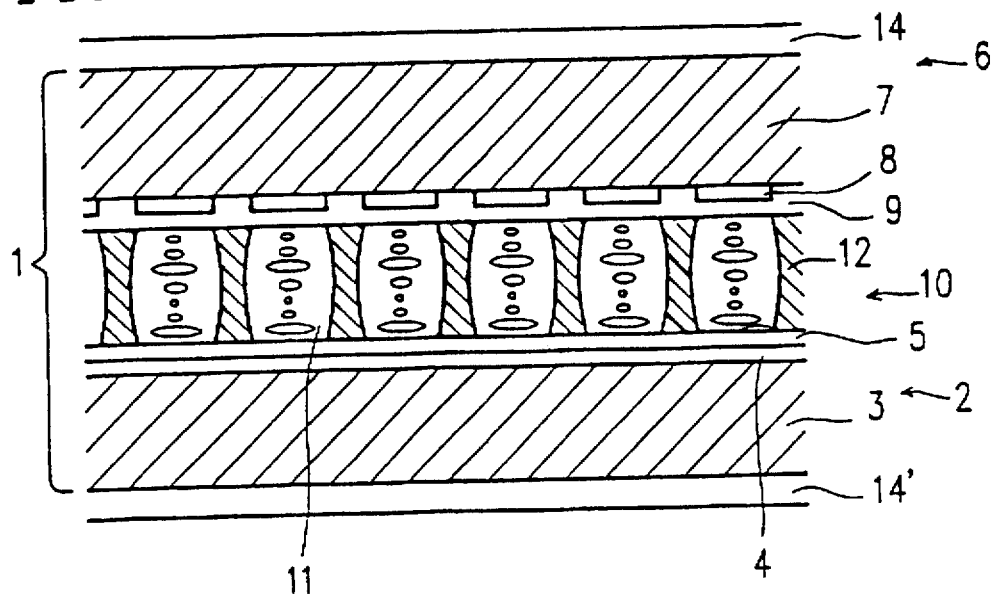
FIG. 1 is a sectional view of a liquid crystal display device according to Example 1 of the invention.

FIG. 1 is a sectional view of an STN liquid crystal display device according to Example 1 of the invention. This liquid crystal display device is a transmissive type, and includes a cell 1 including a display medium 10 sandwiched between substrates 2 and 6 both bearing electrodes. On the outer surfaces of the substrates 2 and 6 constituting the cell 1 are respectively provided polarizing plates 14 and 14'. On the inner surface of the substrate 2, which is constituted from a base substrate 3 made from an insulated substrate such as glass or the like, are formed striped lower electrodes 4 and an alignment film 5 in this order from the base substrate 3. On the inner surface of the substrate 6, which is constituted from a base substrate 7 also made from an insulated substrate such as glass or the like, are formed striped upper electrodes 8 and an alignment film 9 in this order from the base substrate 7.

The display medium 10 sandwiched between the substrates 2 and 6 includes liquid crystal regions 11 each in the shape of a droplet surrounded by a polymeric wall 12. The alignment state of the liquid crystal region 11 is the STN alignment. The polymeric wall 12 is tightly attached or adhered to the substrates 2 and 6.

The method for producing the above-mentioned liquid crystal display device will now be described. First, a photopolymerizable liquid crystal A, i.e., a photopolymerizable compound having liquid crystallinity, (Δε<0) having a polymerizable functional group in its molecule as is represented by the following Formula 1 was synthesized as follows:

Formula 1:

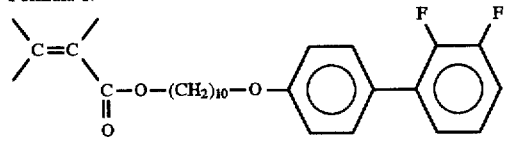

First, 4'-hydroxy-2,3-difluorobiphenyl was esterified with excessive 1,10-dibromodecane in the presence of calcium carbonate. The resultant was purified through column chromatography, and the obtained purified material was mixed with equimolar tetramethylene ammonium-hydroxy pentahydrate. The obtained mixture was esterified with acrylic acid. Thus, the photopolymerizable liquid crystal A was obtained.

After the synthesis of the photopolymerizable liquid crystal A, the substrates 2 and 6 were manufactured as follows: On the surfaces of the substrates 3 and 7 each having a thickness of, for example, 1.1 mm were coated with ITO (a mixture of indium oxide and tin oxide) so as to respectively form the striped lower electrodes 4 and the striped upper electrodes 8 each with a thickness of 500 angstrom (Å). The resultant substrates 3 and 7 were subjected to spin coating with polyimide (Sunever 150; manufactured by Nissan-Chemical Industries Ltd.) to respectively form the alignment films 5 and 9, which were then subjected to a rubbing treatment with a nylon cloth. The substrates 2 and 6 were thus produced. The number of the lower and the upper electrodes 4 and 8 formed per 1 mm was eight, and the interval therebetween was 25 μm.

After the rubbing treatment, the substrates 2 and 6 were attached to each other so that the directions of the rubbing treatment on the respective substrates crossed at 240°. At this point, a spacer with a diameter of 9 μm was interposed therebetween so as to attain a constant cell thickness. Thus, the cell 1 was produced.

Figure 2:
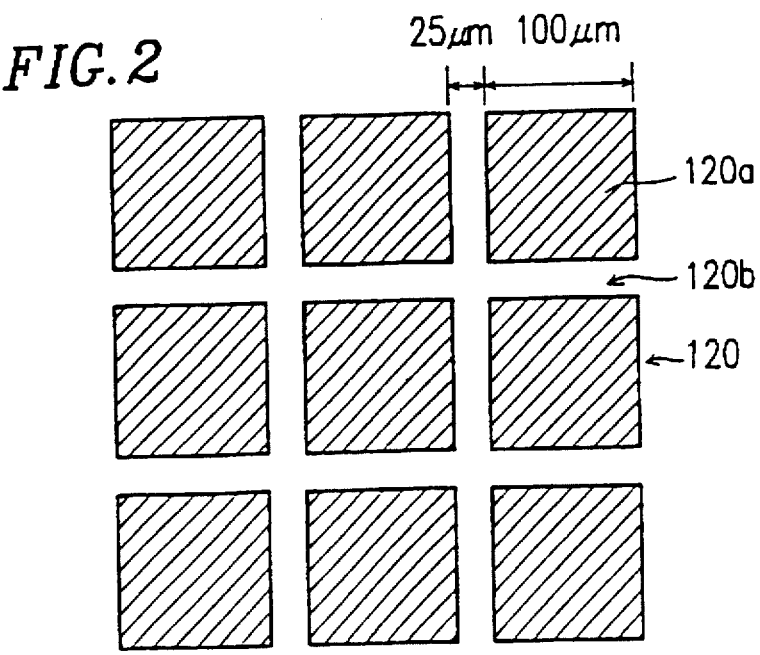
FIG. 2 is a plane view of a photomask used in Example 1.

On the thus produced cell 1, a photomask 120 having light shielding portions 120a and a transparent portion 120b as shown in FIG. 2 was placed so that each of the shielding portions 120a cover each pixel in the cell 1. After or before the placement of the photomask 120, the following mixture was injected into the cell 1 by capillary injection: 0.10 g of R-684 (manufactured by Nippon Kayaku Co., Ltd.), 0.05 g of styrene, 0.10 g of isobornyl acrylate as polymerizable compounds; 0.75 g of the photopolymerizable, liquid crystal A, 4 g of a liquid crystal material ZLI-4427 (wherein the twist angle was previously adjusted to be 240° by adding a chiral agent S-811 (manufactured by Merck & Co., Ltd.)), and 0.025 g of a photopolymerization initiator Irgacure 651. To obtain the mixture, the respective components were homogeneously mixed at an isotropic temperature of 54° C. Among the components of the mixture, the polymerizable compounds and the photopolymerizable liquid crystal A work together as the photopolymerizable material.

Then, the cell 1 containing the mixture was subjected to irradiation with UV rays through the photomask by using a high pressure mercury lamp emitting collimated light at 10 mW/cm² for 90 seconds, while maintaining the temperature thereof at 60° C. Under these conditions, UV rays irradiate the cell 1 in a spatially regular pattern.

Then, the cell 1 was cooled to a temperature of 25° C., where the liquid crystal is in the nematic state, and was subjected to UV-ray irradiation for another three minutes continuously, thereby polymerizing the photopolymerizable material. The cell 1 was then heated to a temperature of 100° C., and annealed to a temperature of 25° C. over 8 hours. During this procedure, the liquid crystal molecules are aligned in accordance with the alignment regulating force on the substrate, resulting in an improved display quality.

The polarizing plates 14 and 14' were attached to the thus produced cell 1 as shown in FIG. 1. At this point, the polarizing plates 14 and 14' were positioned so that the polarization directions cross the rubbing direction at 45° and cross each other at 105°. In this manner, a transmissive type STN liquid crystal display device of a yellow mode using no phase plate was produced.

Figure 3:
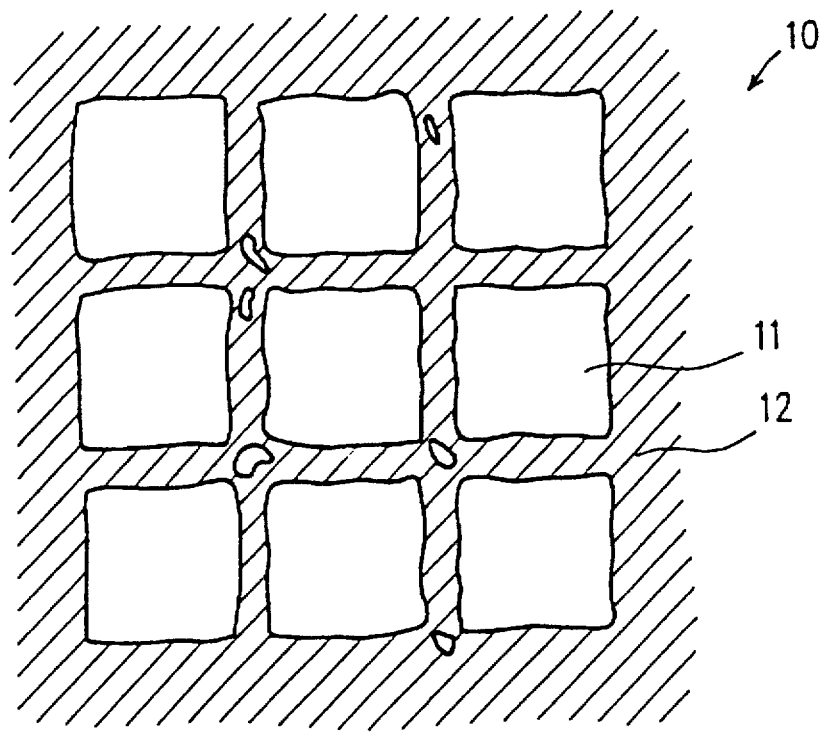
FIG. 3 illustrates liquid crystal regions and a polymeric wall formed in Example 1.

FIG. 3 shows the display medium 10 in the cell 1 observed with a polarizing microscope. As shown in FIG. 3, the liquid crystal regions 11 are formed in accordance with the pattern on the photomask and in a similar structure to that of a conventional STN liquid crystal display device produced in Comparative Example 1 described below. Further, the photopolymerizable material (resin), i.e., the photopolymerizable liquid crystal and the polymerizable compounds, are reacted with the photopolymerization initiator to be polymerized, and hence, the polymeric wall 12 includes a liquid crystalline polymer produced through the polymerization of the photopolymerizable liquid crystal A.

Table 1 shows the electro-optical characteristic of the liquid crystal display device manufactured in Example 1 together with those of devices manufactured in Comparative Examples 1 and 2 described below.

TABLE 1

|  | Example 1 | Comparative Example 1 | Comparative Example 2 |
| --- | --- | --- | --- |
| Contrast | 7 | 12 | 3 |

Comparative Example 1

An STN liquid crystal display device of Comparative Example 1 was manufactured by using the same type of a cell manufactured in Example 1 and injecting the same type of liquid crystal material (i.e., the mixture of the liquid crystal material and the chiral agent used in Example 1) alone into the cell. Polarizing plates were attached to the resultant cell in the same manner as in Example 1. The electrooptical characteristic of the liquid crystal display device is shown in Table 1.

Comparative Example 2

A liquid crystal display device of Comparative Example 2 was manufactured by using the same type Of a cell manufactured in Example 1 and injecting the same type of a mixture used in Example 1 into the cell. The resultant cell was subjected to UV-ray irradiation in the same manner as in Example 1 except that no photomask was used. The electro-optical characteristic of the liquid crystal display device is shown in Table 1.

As is understood from Table 1, the electro-optical characteristic of the liquid crystal display device of Example 1 is as good as that of the conventionally used liquid crystal display device of Comparative Example 1. The electro-optical characteristic of the liquid crystal display device of Example 1 shown in Table 1 was measured on the liquid crystal display device including the polymeric wall 12, which decreases the contrast. When the polymeric wall 12 was covered with a black mask, the contrast was as high as that of the liquid crystal display device of Comparative Example 1. Further, a pressure with a pen against the liquid crystal display device little varied the color of the display.

In order to check the tight attachment between the polymeric wall 12 and the substrates 2 and 6, a portion in the shape of a square of 20 mm×20 mm including the polymeric wall 12 and the liquid crystal regions 11 alone was cut out from the liquid crystal display device. The substrate attached to the polymeric wall 12 was pulled, but could not be peeled off with ease. The same procedure was performed with regard to the liquid crystal display device of Comparative Example 1, in which the substrate was peeled off with ease because of the lack of the polymeric wall.

The liquid crystal display device of Comparative Example 2 has a lower contrast. It is assumed, through the observation with a polarizing microscope, that the contrast is decreased because the polymeric wall was partially formed within a pixel.

Since the polymeric wall 12 in the liquid crystal display device of Example 1 is tightly attached or adhered to the substrates 2 and 6, it is different from the polymeric wall previously formed before the attachment of the substrates disclosed in Japanese Laid-Open Patent Publication No. 4-323616. Further, since the polymeric wall 12 is tightly attached or adhered to the substrates 2 and 6, the variation in the cell thickness caused by an external pressure is suppressed. Therefore, it is possible to avoid the change in the display color and the like otherwise causes in the pen entry. In addition, the resistance against shock when dropped or the like is extremely improved. Further, when the liquid crystalline polymer having the same effect as the alignment regulating force on the substrate is contained within the polymeric wall 12, the alignment state of the liquid crystal is extremely stabilized because the alignment regulating force works both in the horizontal direction from the substrate and in the vertical direction from the polymeric wall 12. Furthermore, since almost all the portion of the polymeric wall 12 is intentionally formed in a non-pixel portion, the contrast decrease due to the polymeric material can be suppressed as compared with the case where a polymeric wall is formed at random. Further, a polymeric thin film is sometimes formed on the interface between the liquid crystal region 11 and the substrate 2 or 6. In this case, the liquid crystal molecules are uniformly oriented because the alignment regulating force on the substrate is transferred to the liquid crystal molecules through the polymeric thin film. In addition, since the liquid crystal region 11 is three-dimensionally surrounded by the polymeric material in this case, the liquid crystal display device achieves a higher resistance against external pressure.

Since the polymeric wall 12 can be formed approximately isotropically, the polymeric wall in the non-pixel portion can work as a black mask when two polarizing plates whose polarization axes cross at right angles are used. When a phase plate having a pattern for each pixel is provided to the liquid crystal display device, a high contrast can be attained.

Figure 4:
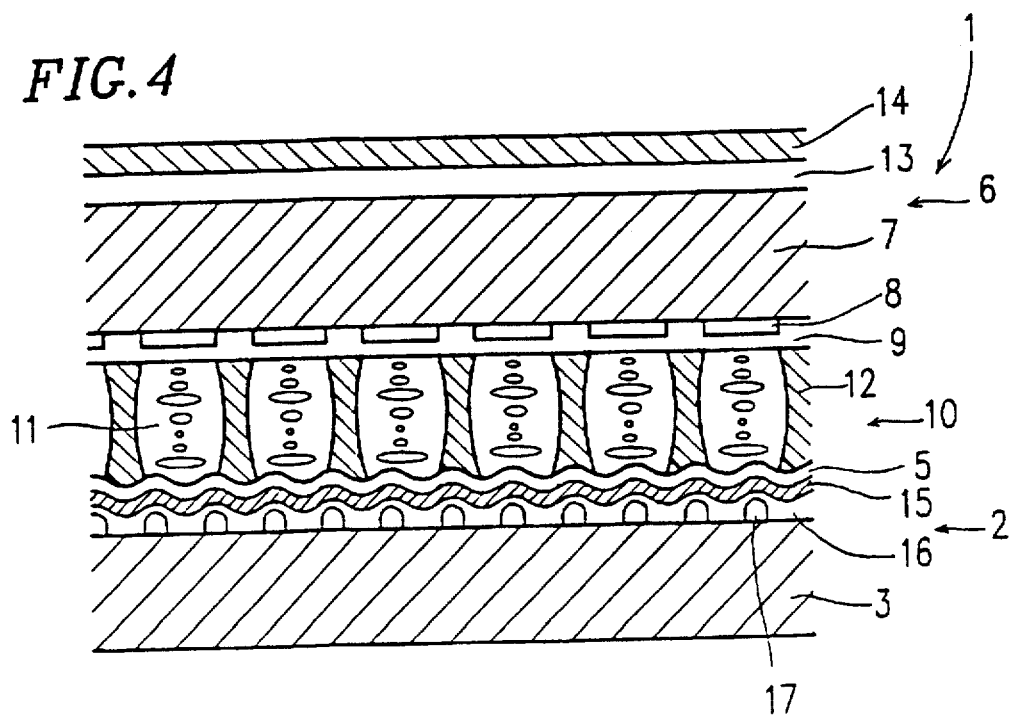
FIG. 4 is a sectional view of a reflective type liquid crystal display device to which the present invention is applied.

The liquid crystal display device of Example 1 is suitable to a transmissive type liquid crystal display device. The present invention, however, is not limited to the transmissive type and can be applied to a reflective type STN liquid crystal display device. FIG. 4 is a sectional view of a reflective type liquid crystal display device to which the present invention is applied. This liquid crystal display device includes one polarizing plate as disclosed in Japanese Laid-Open Patent Publication Nos. 4-289818 and 4-97121. In the liquid crystal display device of FIG. 4, a phase plate 13 is provided between a cell 1 and a polarizing plate 14. A substrate 2 includes a base substrate 3 having projections 17 on the inner surface facing a display medium 10. A leveling film 16 is formed on approximately the entire surface of the substrate 3 so as to cover the projections 17. On the leveling film 16 are formed striped lower electrodes 15 made from a reflective metal film.

Example 2

Figure 5:
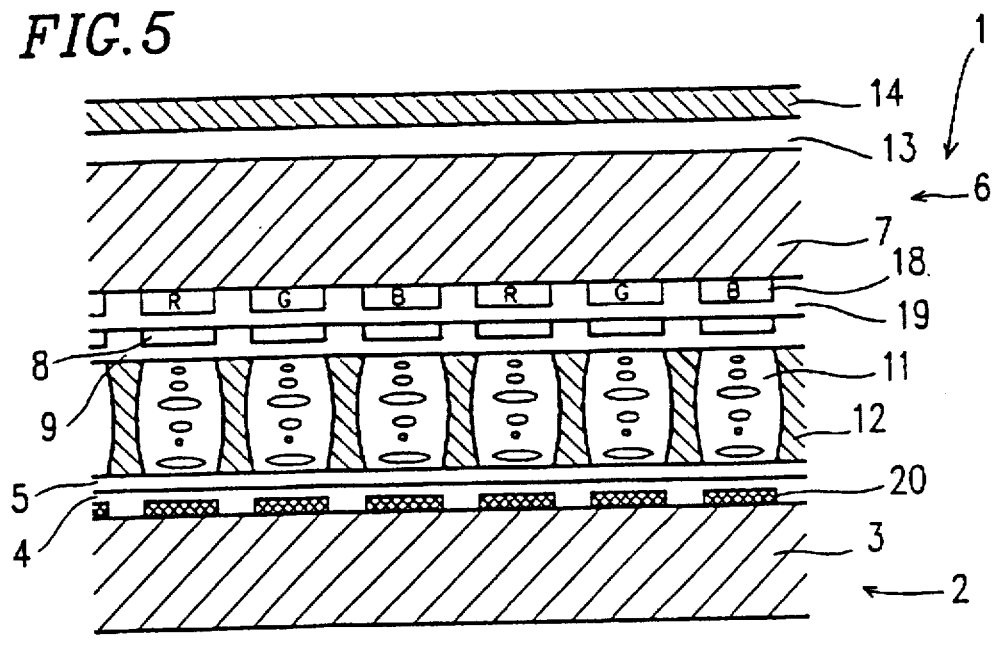
FIG. 5 is a sectional view of a liquid crystal display device according to Example 2, i.e., a self-alignment type liquid crystal display device including a photomask in its cell.
Figure 5:
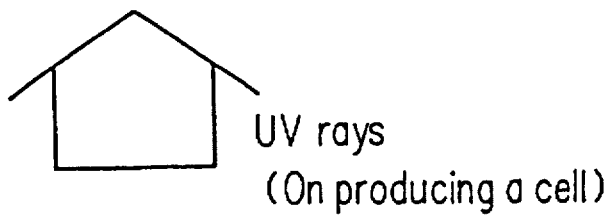

FIG. 5 is a sectional view of a liquid crystal display device according to Example 2. This liquid crystal display device includes, in addition to the components of the device of Example 1 shown in FIG. 1, a reflecting plate 20 on the substrate 2 having a reflecting portion on a position corresponding to each pixel, a color filter 18 and a protection film 19 both on the substrate 6. The substrates 2 and 6 of Example 2 are made from an acrylic plastic substrate bearing an ITO film with a total thickness of 400 μm.

The liquid crystal display device was manufactured as follows: First, the substrates 2 and 6 as above were manufactured, and the alignment treatment was conducted in the same manner as in Example 1.

Figure 6:
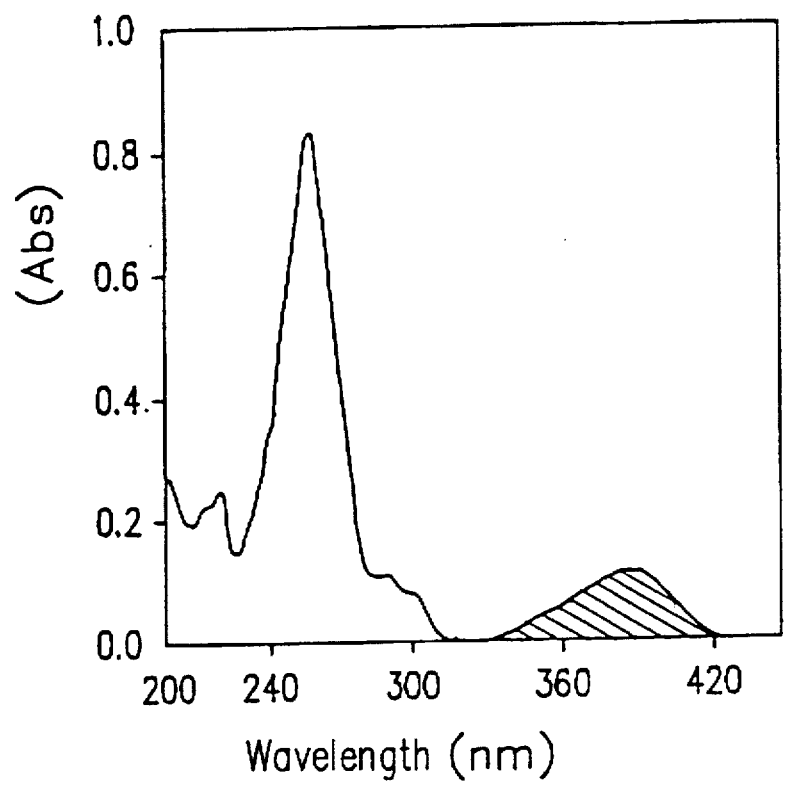
FIG. 6 is a graph of the absorption curve of a photopolymerization initiator used in Example 2.

The substrates 2 and 6 were attached to each other in the same manner as in Example 1 using a spacer with a diameter of 5.8 μm, and the following mixture was injected into the thus produced cell: 0.10 g of R-684 (manufactured by Nippon Kayaku Co., Ltd.), 0.01 g of styrene, 0.14 g of isobornyl acrylate as polymerizable compounds; 0.75 g of the photopolymerizable crystal liquid A, 4 g of the liquid crystal material ZLI-4427 (wherein the twist angle was previously adjusted to be 240° by adding the chiral agent S-811 (manufactured by Merck & Co., Ltd.)), and 0.025 g of a photopolymerization initiator Lucirin TPO (manufactured by BASF; exhibiting largest light absorption around 400 nm as shown with crosshatch in FIG. 6). The mixture was injected into the cell by vacuum injection, for example, at a pressure of 100 Pa. at a temperature of 30° C. and by raising the temperature of the substrates and the used injection plate up to 60° C. simultaneously with the start of the injection. The polymerizable compounds and the photopolymerizable liquid crystal A work together as the photopolymerizable material.

Figure 7:
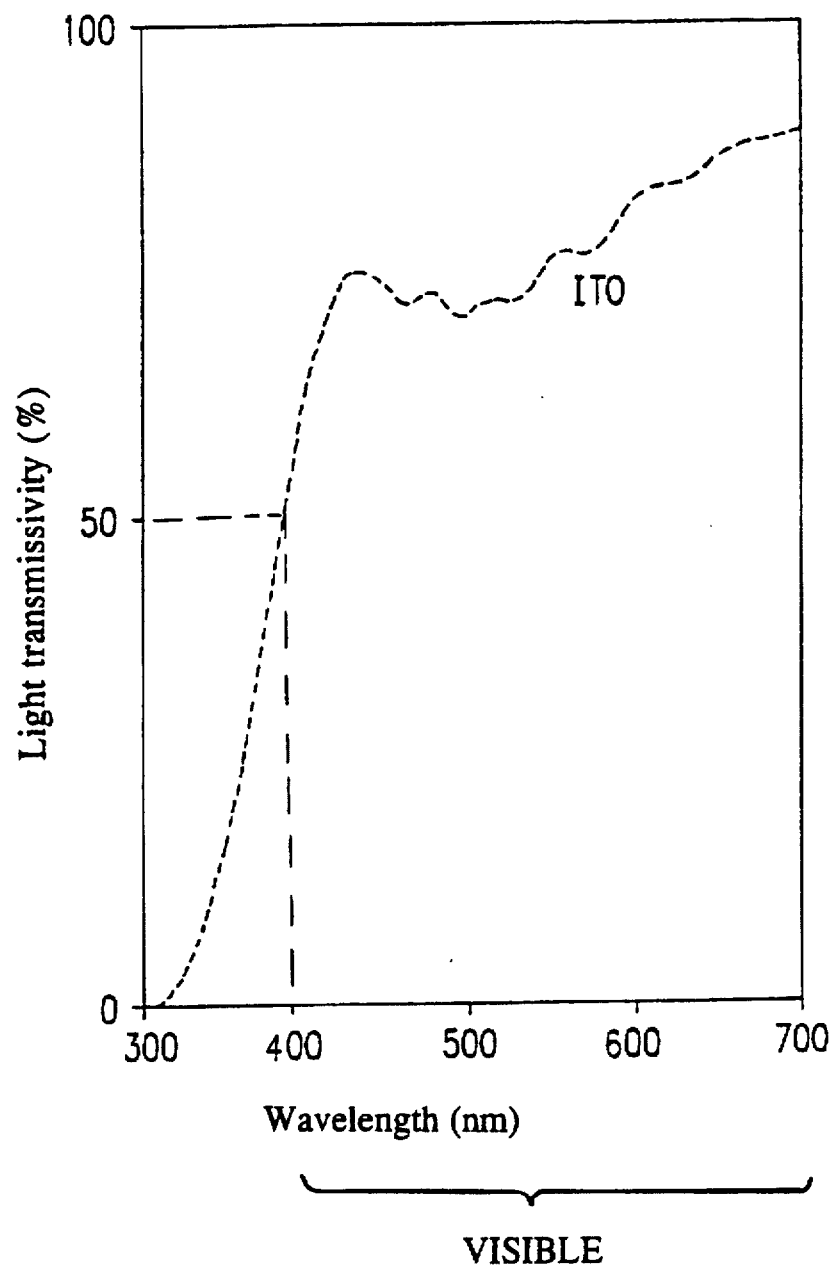
FIG. 7 is a graph of the absorption curve of a plastic substrate used in Example 2.

Then, the cell was heated to a temperature of 80° C., and subjected to UV-ray irradiation through the reflecting plate 20 for 3 minutes at the same UV-ray intensity as in Example 1. The cell was then cooled to a temperature of 25° C., and subjected to the UV-ray irradiation again for another 7 minutes. The cell was then heated to a temperature of 100°C., and annealed to 25° C. over 8 hours. The retardation of the thus produced duced cell 1 ($\Delta n_1 \cdot d_1$) was 650 nm. The substrates 3 and 7 formed from an acrylic plastic substrate bearing the ITO film have an absorption curve as shown in FIG. 7, and substantially cut light below 350 nm.

Figure 8:
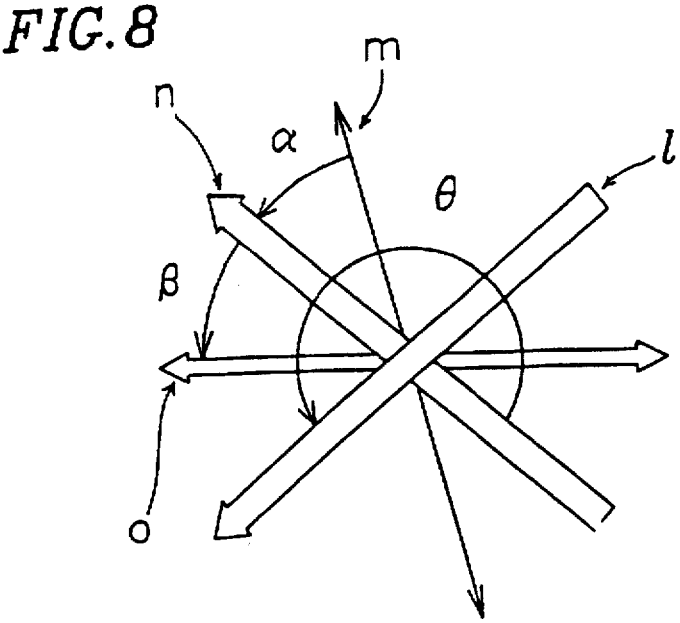
FIG. 8 illustrates optical axes of a polarizing plate and a phase plate and the alignment direction of liquid crystal in a reflective type liquid crystal display device.

Next, the polarizing plate 14 and the phase plate 13 ($\Delta n_2 \cdot d_2 = 350$ nm) e.g., a retardation film were attached to the cell 1 in the relationship as shown in FIG. 8. Thus, a reflective type STN liquid crystal display device including one polarizing plate was produced. FIG. 8 will be described in detail below.

The thus produced liquid crystal display device exhibits the same effect as that of the liquid crystal display device of Example 1. In addition, since the transparent portion of the used reflecting plate 20 corresponds with the photomask used in Example 1, the liquid crystal display device has a configuration as if it included a photomask therein although a photomask is not actually used. In this display device, the distance between the liquid crystal region and the portion working as a photomask is smaller by the thickness of the substrate than in Example 1. Therefore, a polymeric wall is prevented from being formed in a pixel due to the diffraction caused by the photomask, resulting in a simplified production procedure.

Table 2 shows the electro-optical characteristics of the liquid crystal display device of Example 2 together with those of Examples 3 and 4, and Comparative Examples 3 and 4. The characteristics were measured by using a ratio of a reflectance of light entering at an angle of 30° against the normal line of the liquid crystal display device to a reflectance of white light in the direction of the normal line.

TABLE 2

|  | Example 2 | Example 3 | Example 4 | Com. Example 3 | Com. Example 4 |
|---|---|---|---|---|---|
| Contrast | 6 | 3.5 | 4.5 | 1.6 | 2.8 |
| d · Δn(nm) | 650 | 515 | 784 | 448 | 896 |

Examples 3 and 4 and Comparative Examples 3 and 4

Reflection type liquid crystal display devices of Examples 3 and 4 and Comparative Examples 3 and 4 were produced by using the same type of substrates in the same manner as in Example 2 except that the diameter of the spacers was 4.6 μm in Example 3, 7.0 μm in Example 4, 4.0 μm in Comparative Example 3, and 8.0 μm in Comparative Example 4 instead of 9 μm in Example 2. By varying the diameter of the spacers in this manner, the retardation of the resultant liquid crystal display devices was varied. The twist angle of the used liquid crystal was previously adjusted to be 240° by adding S-811.

As is understood from Table 2, the liquid crystal display devices of the Examples 2, 3 and 4 have an improved contrast as compared with those of Comparative Examples 3 and 4.

The present liquid crystal display device represented by the liquid crystal display devices of Examples 1 through 4 have sharpness in the electro-optical characteristics. Therefore, it is possible to attain a sufficient duty ratio, eliminating the need for a TFT. Thus, the production cost can be decreased. Further, since the polymeric wall is formed in the cell, the cell thickness is little varied by external pressure applied by pen entry or the like, thereby causing little display irregularity.

Example 5

Figure 9:
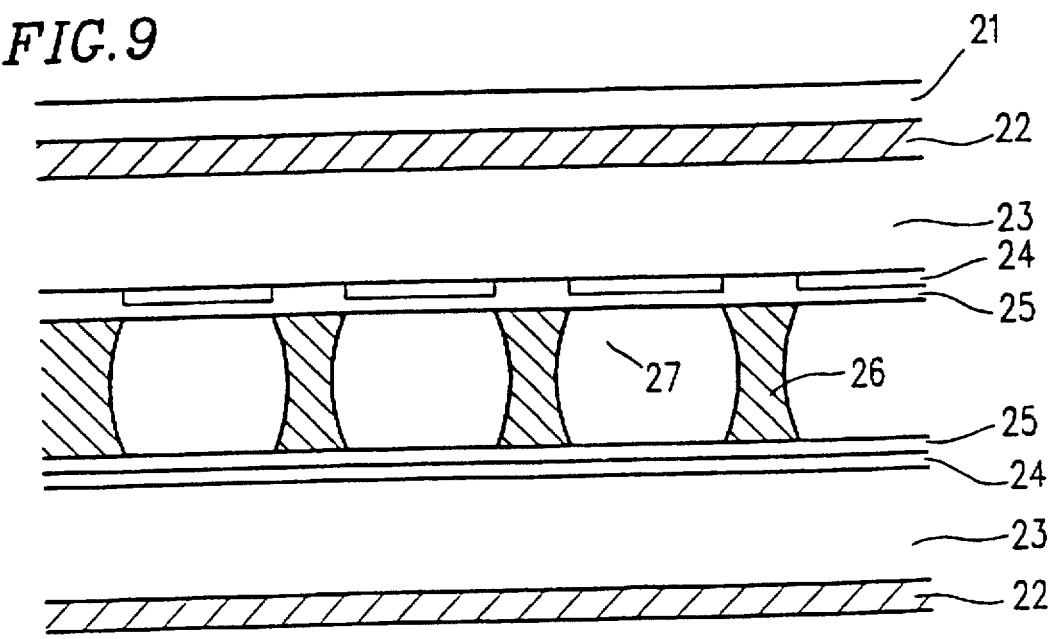
FIG. 9 is a sectional view of a typical cell structure in Example 5.

FIG. 9 is a sectional view of a liquid crystal display input/output device according to Example 5. The liquid crystal display input/output device includes two glass substrates 23 each having a thickness of 1.1 mm. One of the substrates (the upper substrate) has the following configuration: On one of the glass substrates 23 are formed a plurality of transparent electrodes 24 from ITO in a matrix. An alignment film 25 is formed so as to cover the transparent electrodes 24. The other surface of this glass substrate 23 is provided with a polarizing plate 22 and an input device 21.

The other of the substrates (the lower substrate) has the following configuration: On the other glass substrates 23 are also formed a plurality of the transparent electrodes 24 made from ITO. The alignment film 25 is also provided over the transparent electrodes 24. The other surface of this glass substrate 23 is provided with another polarizing plate 22.

The above described two glass substrates 23 sandwich a display medium layer. In the display medium layer, a polymeric wall 26 is formed on a portion excluding the portions of the transparent electrodes 24, and a liquid crystal portion 27 is formed on a portion surrounded by the polymeric wall 26 and corresponding to each transparent electrode 24 through a production procedure described below. The substrates 23 are attached to each other with the display medium layer sandwiched therebetween using a spacer (not shown) in the shape of, for example, a sphere or a cylinder interposed therebetween, thereby attaining a constant cell thickness.

In the aforementioned liquid crystal display input/output device of Example 5, the liquid crystal region 27 substantially surrounded by the polymeric wall 26 between the glass substrates 23 bearing the transparent electrodes 24 has a micro cell structure, as shown in FIG. 9. Further, since the polymeric wall 26 is adhered to the glass substrates 23, the resistance of the device against external pressure is much higher. This high shock resistance is exhibited, for example, when the device is dropped. Moreover, the variation in the cell thickness due to an external pressure is suppressed by the polymeric wall 26, and the display color is prevented from changing even when the device is pressed in the pen entry or the like. Further, when the polymeric liquid crystal having the same effect as the alignment regulating force on the substrate is contained in the polymeric wall 26, the alignment state of the liquid crystal is extremely stabilized because the alignment regulating force works both in the horizontal direction from the alignment film 25 on the substrate 23 and in the vertical direction from the polymeric wall 26. Furthermore, since almost all the portion of the polymeric wall 26 is intentionally formed in a non-pixel portion, the contrast decreases due to the polymeric material can be suppressed as compared with the case where a polymeric wall is formed at random.

Now, Specific Examples and Comparative Examples of Example 5 will be described, although the present invention is not limited to these Specific Examples.

Specific Example 1

1) Synthesis of a polymerizable liquid crystal having a polymerizable functional group in its molecule:

A compound B (having $\Delta\epsilon<0$) represented by the following Formula 2 is synthesized as follows:

Formula 2:

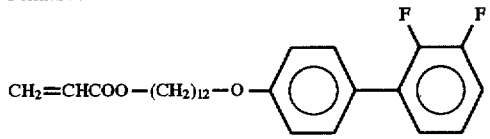

First 4'-hydroxy-2,3-difluorobiphenyl was esterified with excessive 1,12-dibromododecane in the presence of calcium carbonate. The resultant was purified through column chromatography, and the obtained purified material was mixed with equimolar tetramethylene anmonium-hydroxy pentahydrate. The obtained mixture was esterified with acrylic acid.

Figure 10:
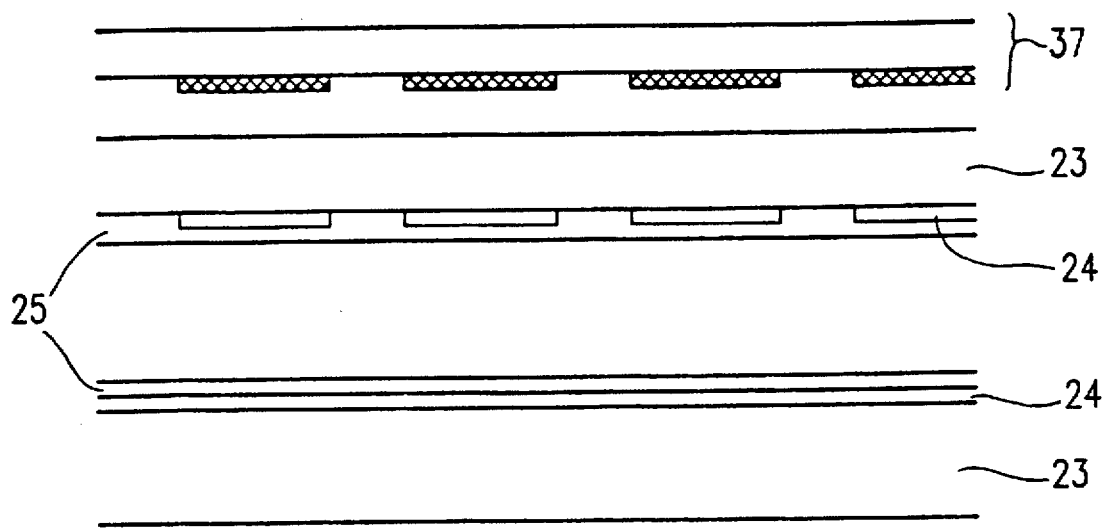
FIG. 10 is a sectional view of the plastic STN liquid crystal display device of Specific Example 1.

2) Production of a cell:

The structure of a liquid crystal display input/output device of Specific Example 1 will be described referring to a sectional view of FIG. 10. As an upper substrate, on the surface of a glass substrate 23 having a thickness of 1.1 mm were formed striped transparent electrodes 24 from ITO so as to have a thickness of 500 Å (eight electrodes/mm; an interval of 25 μm). Then, the resultant substrate 23 was coated by spin coating with polyimide (Sunever 150; manufactured by Nissan Chemical Industries Co., Ltd.), which was then subjected to the rubbing treatment with a nylon cloth in one direction, thereby forming an alignment film 25 on the substrate 23. A lower substrate is formed in the same manner as the upper substrate. The resultant substrates 23 were attached to each other so that the alignment directions thereon cross at 240° with a spacer (not shown) having a diameter of 9 μm interposed therebetween. Thus, a cell was produced.

Figure 11:
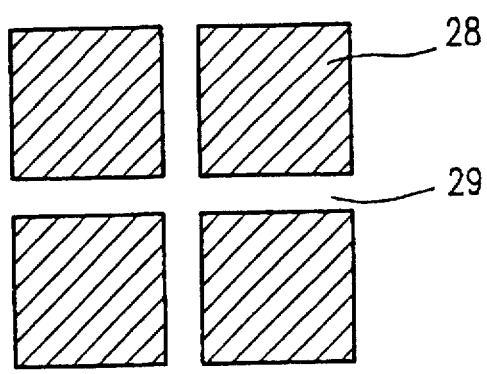
FIG. 11 is a plane view of a photomask used in Specific Example 1.

The cell was provided with a photomask 37 having a dot pattern. The used photomask included, as shown in FIG. 11, a plurality of light shielding portions 28 each having a size of, for example, 100 μm×100 m arranged in a matrix and a transparent portion 29 having a width of 25 μm surrounding the light shielding portions 28. The photomask 37 was provided on the cell so that each pixel in the cell was shielded, and the following mixture was injected into the resultant cell: 0.10 g of R-684 (manufactured by Nippon Kayaku Co., Ltd.), 0.05 g of styrene, 0.75 g of the compound B, 0.10 g of isobornyl acrylate, 4 g of a liquid crystal material ZLI-4427 (wherein the twist angle was previously adjusted to be 240° by adding the chiral agent S-811 (manufactured by Merck & Co., Ltd.)), and 0.025 g of a photopolymerization initiator Irgacure 651.

After mixing these components homogeneously at an isotropic temperature of 5420 C., the mixture was injected by capillary injection. Then, the resultant cell was subjected to the UV-ray irradiation through the dot pattern on the photomask by using a high pressure mercury lamp emitting collimated light at 10 mW/cm$^2$ for 90 seconds at a temperature of 60° C. Then, the cell was cooled to a temperature of 25° C., and subjected to the UV-ray irradiation again for another 3 minutes continuously, thereby polymerizing the polymerizable material. Then, the cell was heated to a temperature of 100° C., and annealed to a temperature of 25° C. over 8 hours.

Figure 12:
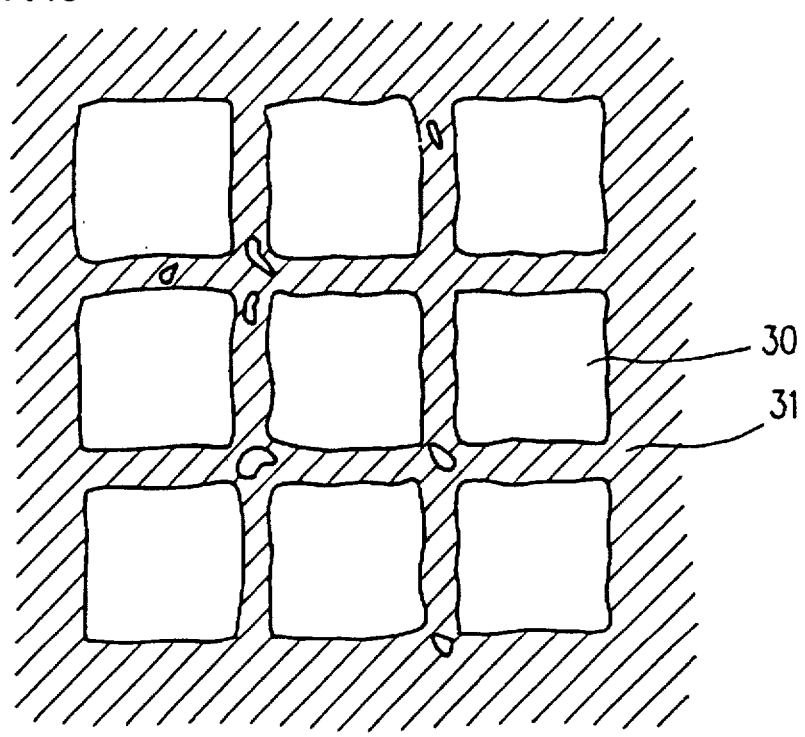
FIG. 12 is a sketch of a polarizing microphotograph of a liquid crystal display device of Specific Example 1.

The observation of the thus produced liquid crystal cell with a polarizing microscope found liquid crystal regions 30 in the same pattern as that of the photomask and a polymeric region 31 as shown in FIG. 12 The liquid crystal region 30 had the similar structure as that of a conventional STN liquid crystal display device produced in Comparative Example 5 described below. To the thus produced cell were attached a phase plate and polarizing plates 22 so that the polarization directions cross the rubbing direction at 45° and each other at 105°, thereby producing a transmissive type STN liquid crystal display device.

When the liquid crystal display device was pressed with a pen or the like, the display color was little varied.

Figure 13A:
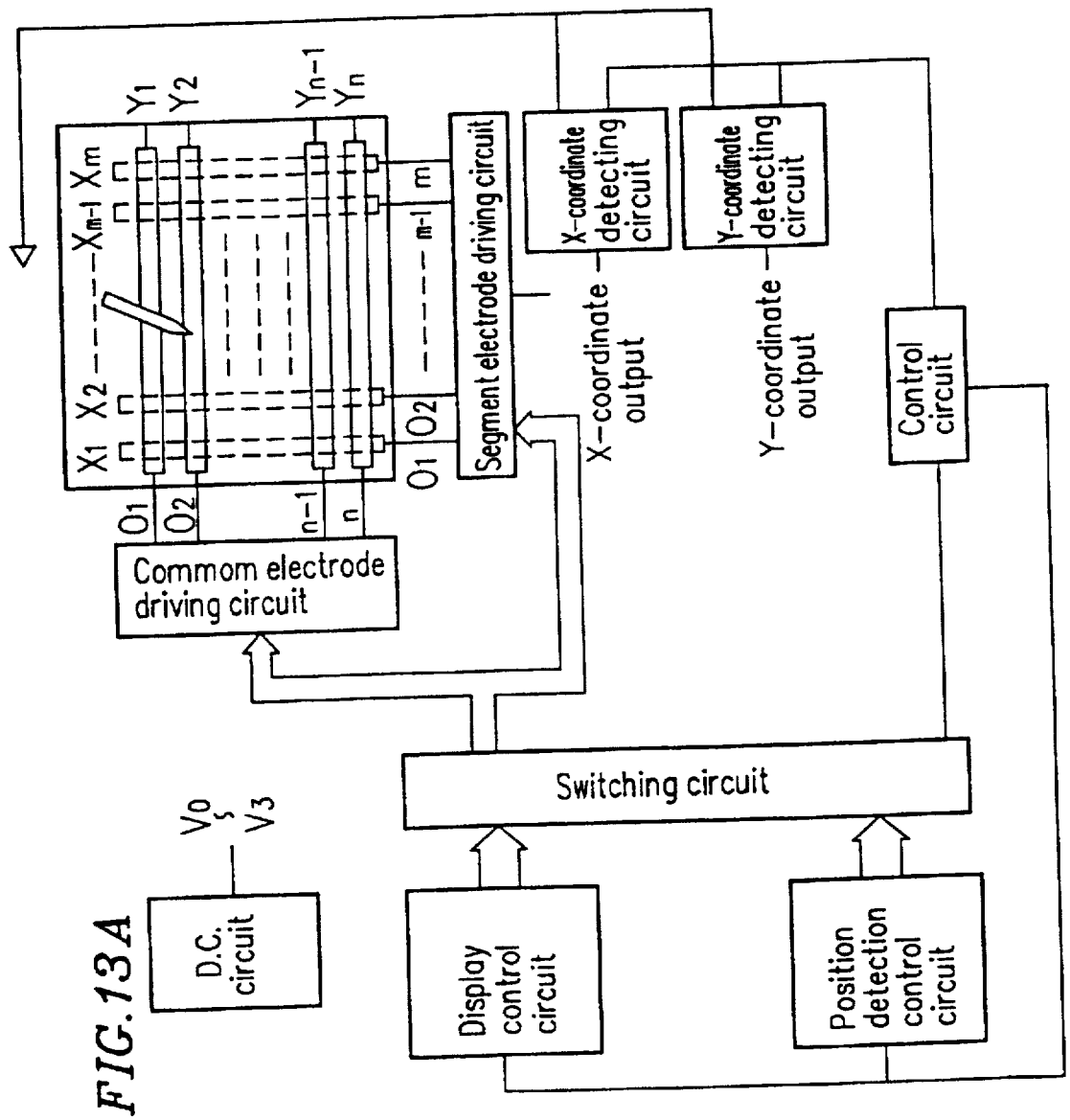
FIGS. 13A, 13B and 13C show a circuit configuration of a liquid crystal display input/output device used in some examples of the invention, a schematic diagram of a conventional liquid crystal display input/output device, and a schematic diagram of a liquid crystal display input/output device of the electrostatic induction system used in an example of the invention, respectively.

The thus produced liquid crystal display device was connected with a circuit for a display integrated tablet of an electrostatic induction type as shown in FIG. 13A, thereby manufacturing a liquid crystal display input/output device (excluding a protection panel). The display quality was little varied by a pen entry operation. The liquid crystal display input/output device shown in FIGS. 13A through 13C will be described in detail below.

Comparative Example 5

Into the same type of a cell produced in Specific Example 1, the liquid crystal material (the mixture of the liquid crystal and the chiral agent used in Specific Example 1) alone was injected, thereby manufacturing a liquid crystal display device of Comparative Example 5. Polarizing plates were attached to the liquid crystal display device in the same manner as in Specific Example 5, thereby manufacturing a conventional STN liquid crystal display device. The STN liquid crystal display device was connected with a circuit for the display integrated tablet of the electrostatic induction system as shown in FIG. 13A, thereby producing a liquid crystal display input/output device. Through the pen entry operation, display irregularity such as reverse contrast viewing was caused by the pressure with the pen. The display irregularity was especially conspicuous in displaying black.

Specific Example 2

A liquid crystal display input/output device, according to Specific Example 2 will be described referring to a sectional view of FIG. 14. On one of two acrylic plastic substrates 23 each having a thickness of 400 μm (whose absorption curve is shown in FIG. 7) was provided with a reflecting plate 32 having a transparent portion 39 corresponding to the position of each pixel as shown in FIG. 15. The other substrate 23 had a color filter 33 and a protection film 34. The same alignment treatment as in Specific Example 1 was conducted, and the resultant substrates 23 were attached to each other with a spacer having a diameter of 5.8 um interposed therebetween, thereby manufacturing a reflective type cell as shown in FIG. 14.

Figure 16:
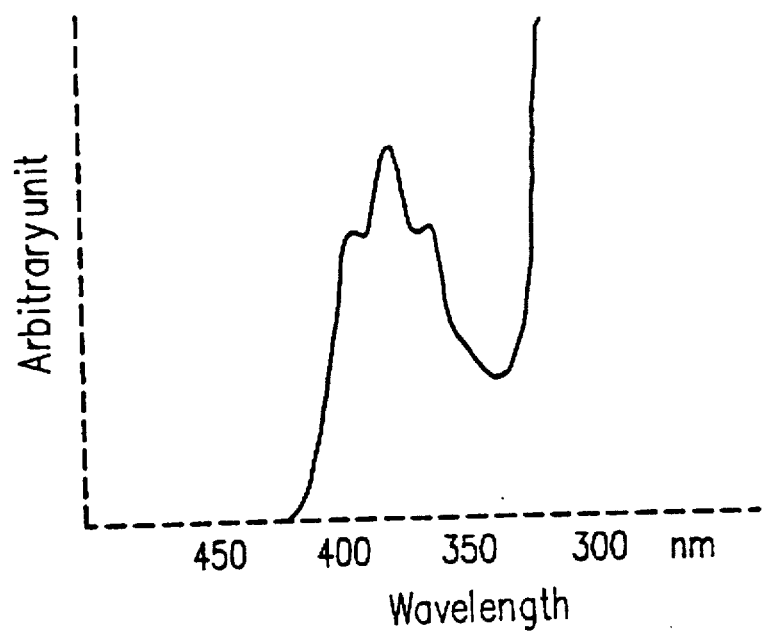
FIG. 16 is a graph of the absorption curve of a photopolymerization initiator used in Specific Example 2.

The mixture to be injected into the cell was the same as that used in Specific Example 1 except that the photopolymerization initiator alone was replaced with KAYACURE DETX-S (manufactured by Nippon Kayaku Industries Co., Ltd.) This photopolymerization initiatar has an absorption curve as is shown in FIG. 16, and causes polymerization with visible light at 350 through 400 nm. The mixture was injected into the cell by vacuum injection at a pressure of 100 Pa. at a temperature of 30° C. and by raising the temperature of the substrates and the used injection plate up to 60° C. simultaneously with the start of the injection. The resultant cell was subjected to UV-ray irradiation through the reflecting plate 32 at the same UV-ray intensity as in Specific Example 1 at a temperature of 80 C. for 10 minutes. Then, the cell was annealed to a temperature of 25° C. over 5 hours. The retardation ($\Delta n_1 \cdot d_1$) of the thus produced liquid crystal display was 650 nm. A polarizing plate 22 and a phase plate 32 a retardation film ($\Delta n_2 \cdot d_2 = 350$ nm) were attached to the cell, thereby manufacturing a reflective type STN liquid crystal display device including one polarizing plate as shown in FIG. 14.

Figure 14:
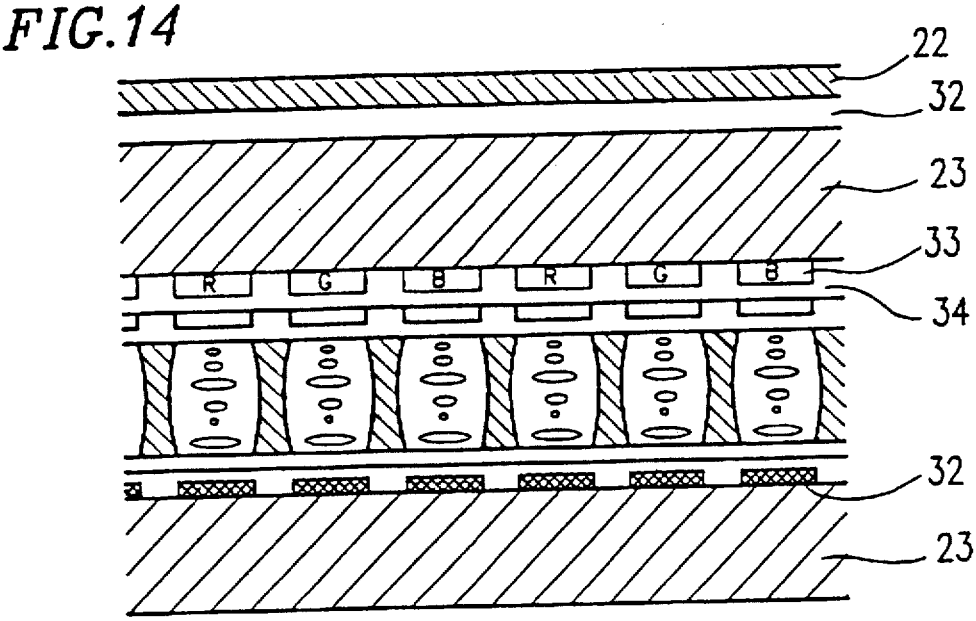
FIG. 14 is a sectional view of a reflective type STN liquid crystal display device of Specific Example 2.
Figure 14:
Figure 15:
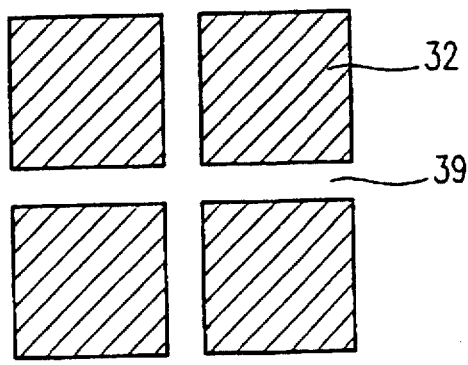
FIG. 15 is a plane view of a reflecting plate used in Specific Example 2.

The thus manufactured liquid crystal display device was connected with the circuit for the display integrated tablet of the electrostatic induction system as shown in FIG. 13A, thereby producing a liquid crystal display input/output device (excluding a protection panel), as shown in FIG. 14. The display quality was little changed by the pen entry operation.

Comparative Example 6

Into the same type of a cell as that manufactured in Specific Example 2, the same type of liquid crystal material alone (the mixture of the liquid crystal and the chiral agent used in Specific Example 1) was injected, thereby manufacturing a cell. A polarizing plate was attached to the thus manufactured cell in the same manner as in Specific Example 2, thereby manufacturing a conventional STN liquid crystal display device (using a plastic substrate). The STN liquid crystal display device was connected with the circuit for the display integrated tablet of the electrostatic induction system as shown in FIG. 13A, thereby producing a liquid crystal display input/output device.

Through the pen entry operation, display irregularity such as reverse contrast viewing was caused by the pressure with the pen. Further, after finishing the display, the alignment of the liquid crystal was disordered for several seconds at a portion to which a pressure was applied with the pen. The display irregularity was especially conspicuous in displaying black.

Specific Example 3

Figure 17:
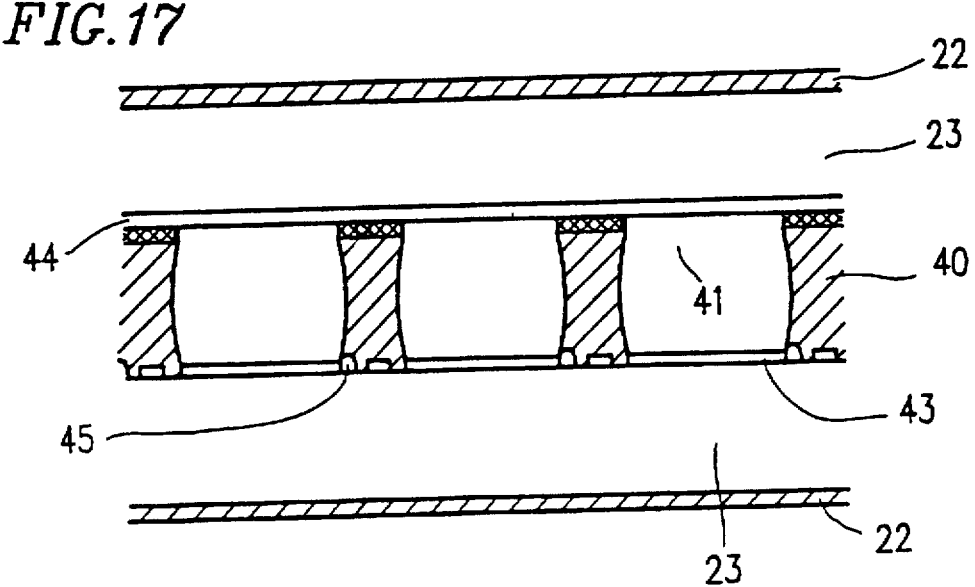
FIG. 17 is a sectional view of a liquid crystal display device of Specific Example 3.
Figure 18:
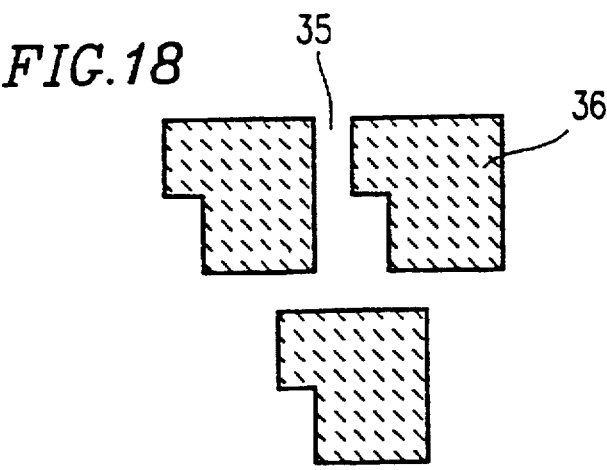
FIG. 18 is a plane view of a photomask used in Specific Example 3.

A liquid crystal display input/output device of Specific Example 3 will be described referring to a sectional view of FIG. 17. A glass substrate 23 having a thickness of 1.1 mm and bearing a TFT device 45 and transparent electrodes 43 of ITO with a thickness of 500 Å was used as a lower substrate. Another glass substrate 23 having a thickness of 1.1 mm and bearing transparent electrodes 44 was used as an upper substrate. These two substrates 23 were attached to each other with a spacer (not shown) with a diameter of 6 μm interposed therebetween, thereby manufacturing a cell. The upper substrate can be provided with a color filter. The cell was provided with a photomask with a dot pattern having light shielding portions 36 and a transparent portion 35 as shown in FIG. 18.

The mixture to be injected into the cell was obtained by mixing 0.1 g of R-684 (manufactured by Nippon Kayaku Industries Co., Ltd.), 0.05 g of styrene, 0.85 g of isobornyl methacrylate, 4 g of the liquid crystal material ZLI-4792 (manufactured by Merck & Co., Ltd.) including 0.4 wt% of S-811, and 0.0025 g of the photopolymerization initiator Irgacure 651. The mixture was injected into the cell in a transparent state (i.e., at a temperature of 35° C.). While keeping this temperature, the cell was subjected to UV-ray irradiation through the dot pattern on the photomask by using a high pressure mercury lamp emitting collimated light at 10 mW/cm$^2$ for 1 second, and the irradiation was stopped for 30 seconds. This cycle of 1 second of irradiation and 30 seconds of non-irradiation was repeated 20 times. Then, the cell was subjected to the UV-ray irradiation again for another ten minutes, thereby polymerizing the polymerizable material.

The observation of the thus manufactured liquid crystal display device with a polarizing microscope found that a liquid crystal domain was formed in the same regularity as the dot pattern on the photomask, i.e., as the pattern of the electrodes 43.

Figure 19:
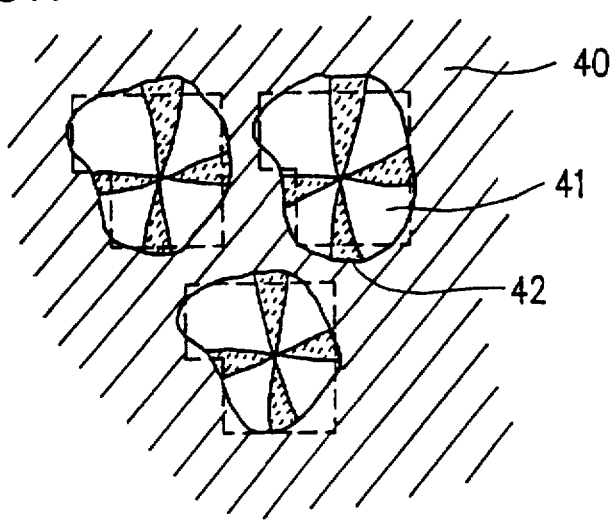
FIG. 19 is a sketch of a polarizing microphotograph of a liquid crystal region formed in a liquid crystal display device of Specific Example 3.

The thus obtained cell was sandwiched between a pair of polarizing plates 22 so that the polarization axes thereof cross at right angles. In the resultant liquid crystal display device, a liquid crystal region 41 was surrounded by a polymeric wall 40. The observation of this liquid crystal display device with a polarizing microscope found, as shown in FIG. 19, that each pixel included approximately one liquid crystal domain. In addition, a schlieren texture 42, which is generally observed when the liquid crystal molecules are aligned radially or concentrically, was observed.

Comparative Example 7

Into the same type of a cell as that manufactured in Specific Example 3, the liquid crystal material ZLI-4792 (manufactured by Merck & Co., Ltd.) including 0.4 wt% of S-811 was injected. The cell was provided with polarizing plates so that the polarization axes be matched with each other, thereby manufacturing a conventional TN liquid crystal display device.

Figure 13B:
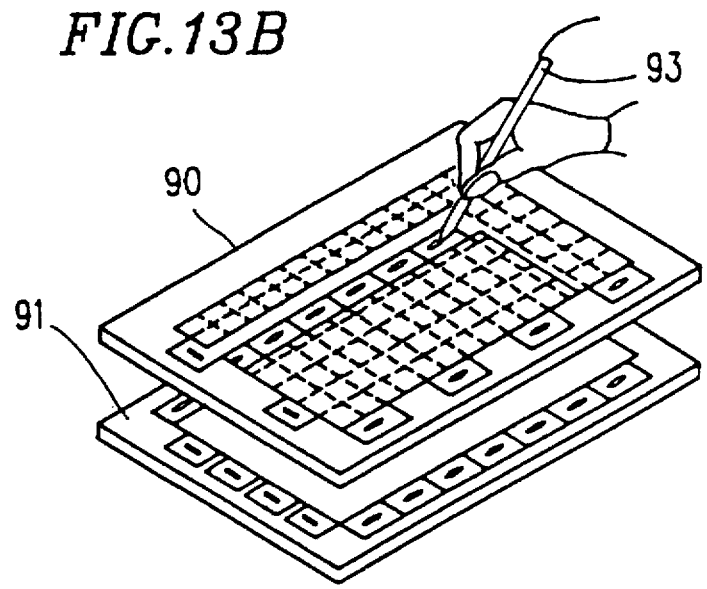

The tablet of an electrostatic induction system as shown in FIG. 13B was connected below the manufactured liquid crystal display device, thereby producing a liquid crystal display input/output device (excluding a protection panel on the top surface). Through the pen entry operation, display irregularity such as reverse contrast viewing was caused by the pressure with the pen. The display quality on the portion pressed with the pen was degraded.

Specific Example 4

A liquid crystal display output/input device according-to Specific Example 4 will be described referring to the sectional view of FIG. 9.

On the surfaces of two glass substrates 23, transparent electrodes were formed by evaporating an ITO film with a thickness of approximately 100 nm, and the resultant substrates 23 were subjected to a wet etching process, thereby forming a plurality of parallel electrode lines 24 in a pattern. The surface of each glass substrate 23 bearing the transparent electrode lines 24 was subjected to spin coating with polyimide, thereby forming a polyimide alignment film with a thickness of approximately 50 nm. The substrate 23 was then sintered for 1 hour at a temperature of 190° C., and subjected to a rubbing treatment in one direction, thereby forming an alignment film 25. the rubbing directions were the same on the both substrates 23 when they were opposed to each other so that the surfaces bearing the transparent electrode lines 24 face each other and attached to each other so that the electrode lines 24 thereon cross each other at right angles. The two substrates 23 were attached to each other in the above-mentioned manner with silica beads (not shown) having a diameter of 2 μm interposed therebetween as a spacer. Thus, the cell of Specific Example 4 was produced.

Next, 0.80 g of a ferroelectric liquid crystal material ZLI-4003 (manufactured by Merck & Co., Ltd.), 0.02 goof of polyethylene glycol diacrylate (brand name: NK ester A-200; manufactured by Shin Nakamura Chemical Industrial Co.,Ltd.) as a polymerizable material (polymer precursor), and 0.18 g of lauryl acrylate (brand name: NK ester LA; manufactured by Shin Nakamura Chemical Industrial Co.,Ltd.) were homogeneously mixed, and the mixture was injected into the cell. This liquid crystal-polymer precursor mixture is in a nematic phase or isotropic liquid phase at atmospheric pressure. The Curie temperature of the mixture is as follows:

$$SmC<25° C.<SmA<31° C.<Ch<35° C.<Iso$$

Next, the cell was provided with a photomask as shown in FIG. 11. Under a condition where the liquid crystal-polymer precursor mixture was in the nematic phase or the isotropic liquid phase, the cell was subjected to the UV-ray irradiation through the photomask by using a high pressure mercury lamp emitting collimated light at 10 mW/cm² for 2 minutes. The UV-ray irradiation photopolymerized the mixture, thereby causing phase-separation between the liquid crystal and the polymeric material. Thus, liquid crystal regions 27 and a polymeric wall 26 were formed.

The observation of the phase-separation with a polarizing microscope found that the polymeric wall was not formed in a portion shielded by the photomask but formed in and in the vicinity of a portion irradiated with UV rays.

When the cell was observed with a polarizing microscope having a crossed nicol, in the center of a liquid crystal droplet formed in the UV-ray shielded portion, a general SSF (surface stabilized ferroelectric) type alignment was found in the rubbing direction on the substrate, and the alignment was sharply changed in the vicinity of the polymeric wall to be vertical.

The tablet of the electrostatic induction system as shown in FIG. 13B was connected below the manufactured liquid crystal display device, thereby producing a liquid crystal display input/output device (excluding a protection panel on the top surface).

Throughout the pen entry operation, display irregularity such as reverse contrast viewing was not caused by the pressure with the pen.

Comparative Example 8

Into the same type of a cell manufactured in Specific Example 4, the ferroelectric liquid crystal material ZLI-4003 (manufactured by Merck & Co., Ltd.) was injected. The cell was heated to 120° C., and then annealed to room temperature, thereby manufacturing a cell. Polarizing plates were attached to the cell so that the polarization axes thereof were matched with the alignment direction, thereby manufacturing a conventional FLC (ferroelectric liquid crystal) display device. The thus obtained liquid crystal display device was connected with the circuit for the display integrated tablet of the electrostatic induction system of FIG. 13A, thereby producing a liquid crystal display input/output device. Throughout the pen entry operation, display irregularity such as reverse contrast viewing was caused by the pressure with the pen. Further, after finishing the display, the alignment of the liquid crystal was disordered for several seconds at a portion to which pressured was applied with the pen. The display irregularity was especially conspicuous in displaying black.

Example 6

Figure 20:
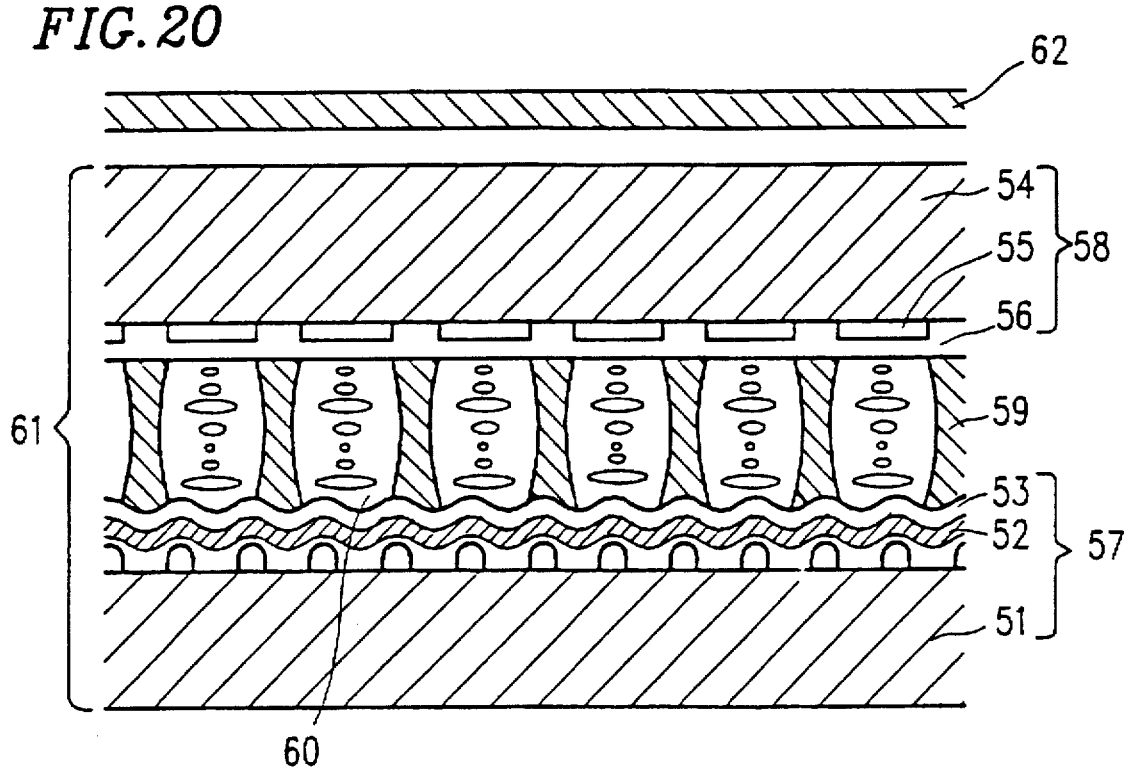
FIG. 20 is a sectional view of a reflective type STN liquid crystal display device of Example 6.

FIG. 20 is a sectional view of a reflective type STN liquid crystal display device according to Example 6. As shown in FIG. 20, a base substrate 51 is provided with lower electrodes 52 and an alignment film 53. A base substrate 54 is provided with upper electrodes 55 and an alignment film 56. A pair of electrode substrates 57 and 58 are thus constituted. A cell 61 includes a great number of liquid crystal regions 60 (areas utilizing the alignment regulating force on the surface of the substrates) substantially surrounded by a polymeric wall 59 and sandwiched between the electrode substrates 57 and 58. On the-other surface of the base substrate 54 than the surface facing the liquid crystal regions 60 is provided a polarizing plate 62.

In order to form the polymeric wall 59, the transparent electrode substrates 57 and 58 are irradiated with UV rays. Due to the transparent electrodes 52 and 55, which work as optical portions having UV-ray absorbing property, the irradiating UV rays attain a light intensity distribution, which causes phase-separation between the liquid crystal and the polymeric material. As a result, the polymeric wall 59 and the liquid crystal regions 60 are formed in accordance with the light intensity distribution. Since the polymeric wall 59 is tightly attached and/or adhered to the electrode substrates 57 and 58, and sandwiched therebetween in this manner, the cell thickness is much less varied by an external pressure, the display color is prevented from changing when pressed with a pen, and the shock resistance is extremely improved.

Moreover, the components in the polymeric wall 59 have birefringence and are in the same alignment state as in the liquid crystal regions 60. Because of this, the alignment in the polymeric wall 59 is approximately the same as that in the liquid crystal regions 60 under application of no voltage, resulting in approximately the same light transmission in the liquid crystal regions 60 and the polymeric wall 59.

Particularly, in a reflective type liquid crystal display device, the brightness under application of no voltage is improved.

It is preferable that the index refraction anisotropy $\Delta n_P$ of the polymeric wall 59 and the index refraction anisotropy $\Delta n_{LC}$ of the liquid crystal region 60 satisfy the following relationship:

$$\Delta n_P > (1/10) \times \Delta n_{LC} \tag{1}$$

When the index refraction anisotropy of the polymeric wall is smaller than $(1/10) \times \Delta n_{LC}$, the brightness under application of no voltage cannot be improved because the light transmission through the polymeric wall is decreased.

The optimal value of the birefringence of the liquid crystal region 60 under application of no voltage depends upon the mode of the liquid crystal region 60, and hence, the birefringence of the liquid crystal region preferably has an optimal value determined by the mode of the formed liquid crystal region.

Further, the chiral pitch of the polymeric wall 59, which is one of the factors affecting the light transmission, is significant to improve the brightness under application of no voltage. It is preferable that the chiral pitch $P_P$ of the polymeric wall 59 and the chiral pitch $P_{LC}$ of the liquid crystal region 60 satisfy the following relationship:

$$P_P < 10 \times P_{LC} \quad (2)$$

When the relationship (2) is not satisfied, the brightness under application of no voltage is less improved.

The optimal value of the chiral pitch depends upon the mode of the liquid crystal region 60, and the chiral pitch of the liquid crystal region preferably has an optimal value determined by the mode of the formed liquid crystal region.

Formula 4:

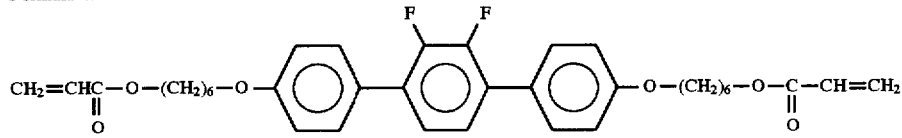

In adopting a mode where the twist of the liquid crystal is not used, such as the ECB mode, the chiral pitch in the liquid crystal region 60 under application of no voltage is infinity.

Now, Specific Examples and Comparative Examples of Example 6 will be described.

Specific Example 5 (Transparent type STN liquid crystal display device)

On the surfaces of two glass substrates each having a thickness of 1.1 mm were formed striped transparent electrodes from ITO so as to have a thickness of 2000 Å (eight electrodes/mm; an interval of 25 μm). Then, the resultant substrates were coated by spin coating with polyimide (Sunever 150; manufactured by Nissan Chemical Industries Co., Ltd.), which was then subjected to the rubbing treatment with a nylon cloth in one direction. After the rubbing treatment, the resultant substrates were attached to each other so that the alignment directions thereon cross at 240° with a spacer having a diameter of 9 μm interposed therebetween. Thus, a cell was produced.

Next, 0.012 g of a compound C (polymerizable chiral agent) represented by the following Formula 3, 0.10 g of p-phenyl styrene, 0.85 g of a compound D represented by the following Formula 4, 0.038 g of 1,4butanediol dimethacrylate, 5 g of the liquid crystal ZLI-4427 (manufactured by Merck & Co., Ltd.; wherein the twist angle was previously adjusted to be 240° by adding S-811), and 0.025 g of the photopolymerization initiator Irgacure 651 were homogeneously mixed. The obtained mixture was injected into the cell by pillary injection. The thus produced cell was irradiated with UV rays from both sides by using two high pressure mercury lamps emitting collimated light at 10 mW/cm² for 4 minutes at a temperature of 60° C. Under these conditions, since the difference in intensity of UV rays occurs between the portion where the ITO electrodes exist and the portion where the ITO electrodes do not exist, the irradiating UV rays had a light intensity distribution with spatial regularity. Then, the cell was cooled to a temperature of 20° C., where the liquid crystal was in the nematic state. The cell was subjected to the UV-ray irradiation again for another 3 minutes continuously, thereby polymerizing the polymerizable material. The cell was then heated up to a temperature of 100° C. and annealed to 25° C. over 8 hours. Through this procedure, the liquid crystal molecules were aligned in accordance with the alignment regulating force on the substrate, thereby improving the display quality of the resultant liquid crystal display device.

Formula 3:

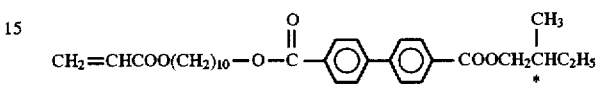

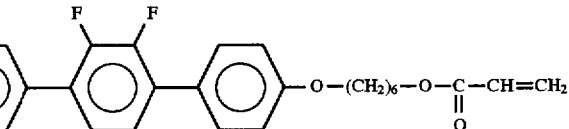

wherein * indicates an asymmetric carbon atom.

Figure 21:
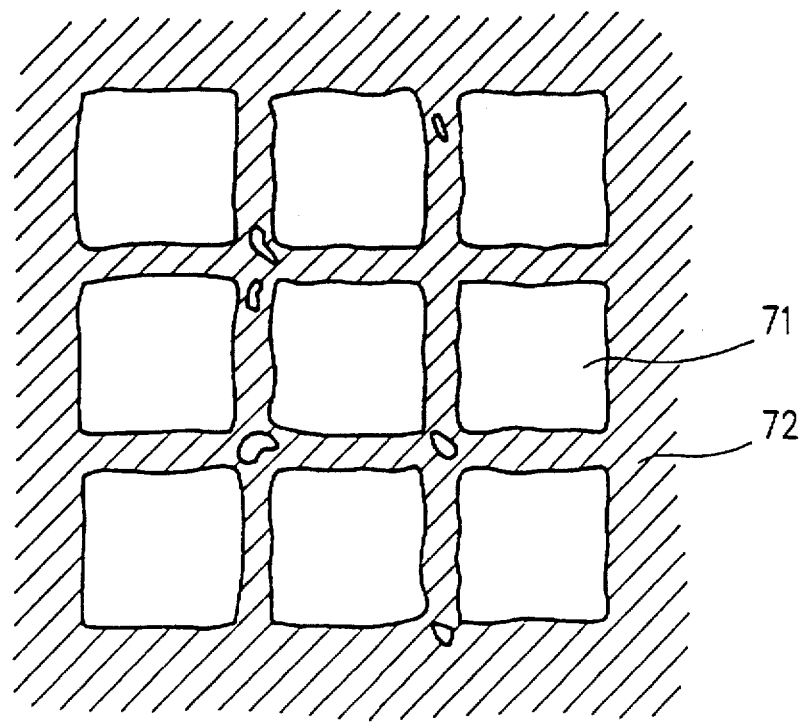
FIG. 21 is a sketch of a polarizing microphotograph of a liquid crystal display device of Specific Example 5.
Figure 22:
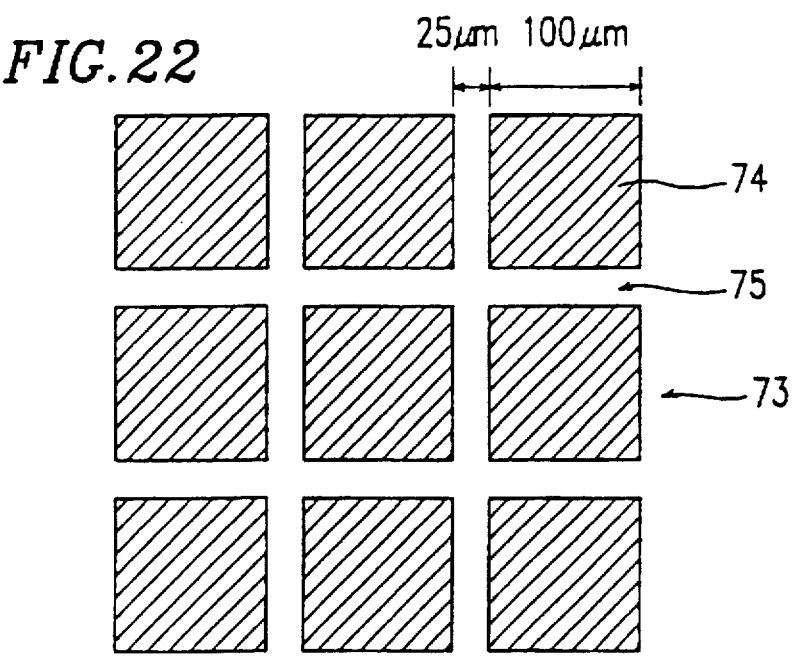
FIG. 22 is a plane view of a photomask used in Specific Example 5.

The observation of the thus produced cell with a polarizing microscope found, as shown in FIG. 21, that liquid crystal regions 71 and a polymeric wall 72 were formed in accordance with the pattern of overlaid portion of the upper and lower ITO electrodes (100 μm ×100 μm) and that the liquid crystal regions 71 had the similar structure as that of a conventional STN liquid crystal display device manufactured in Comparative Example 9 described below. This means that the ITO electrodes work as means including light shielding portions 74 each in the shape of a square of 100 μm ×100 μm surrounded by a transparent portion 75 having a width of 25 μm as shown in FIG. 22.

To the thus produced cell were attached polarizing plates so that the polarization directions cross the rubbing direction at 45° and cross each other at 105°, thereby producing a transmissive type STN liquid crystal display device. Since the photopolymerizable liquid crystal was polymerized in the polymeric wall, the polymeric wall contained a liquid crystalline polymer. Accordingly, it was observed that also the polymeric wall was transmissive.

The transmission ratio under application of no voltage of the thus produced liquid crystal display device is indicated as a ratio to that of a liquid crystal display device produced in Comparative Example 9 described below whose transmission is taken as 100, and listed in Table 3 below.

TABLE 3

| Transmission ratio under application of no voltage: | | | | | |
|---|---|---|---|---|---|
| Spec. Example 5 | Spec. Example 6 | Spec. Example 7 | Com. Example 10 | Com. Example 11 | Com. Example 12 |
| 89 | 86 | 81 | 24 | 70 | 71 |

As is understood from Table 3, the electrooptical characteristics of the liquid crystal display device of Specific Example 5 are as good as those of the conventionally used liquid crystal display device manufactured in Comparative Example 9. In addition, when the present liquid crystal display device was pressed with a pen, the display color was little changed.

In order to check the tight attachment between the polymeric wall and the substrates, a portion in the shape of a square of 20 mm ×20 mm including the polymeric wall and the liquid crystal regions alone was cut out from the cell. The substrate attached to the polymeric wall was pulled, but could not be peeled off with ease. The same procedure was performed with regard to the cell of Comparative Example 9, but the substrate was peeled off while cutting the square portion.

By using the same type of mixture of the photopolymerizable material and the photopolymerization initiator, the chiral pitch of the polymeric material obtained from the mixture was estimated by using a wedge type cell. Further, the photopolymerizable material alone was polymerized between vertical alignment films and between horizontal alignment films, thereby estimating $\Delta n$ by using an Abbe refractometer. The estimated $\Delta n$ and chiral pitch ($\mu m$), which are the characteristics of the polymeric material after the polymerization, are listed in Table 4 below.

TABLE 4

|  | $\Delta n$ | Chiral pitch ($\mu m$) |
| --- | --- | --- |
| Comparative Example 11 | ≈0 | 0 |
| Comparative Example 12 | ≈0 | 0 |
| Specific Example 5 | 0.052 | 22 |
| Specific Example 6 | 0.044 | 22 |
| Specific Example 7 | 0.017 | 22 |
| ZLI-4427 | 0.112 | 14 |

Comparative Example 9

Into the same type of a cell manufactured in Specific Example 5, the same type of the liquid crystal material (the mixture of the liquid crystal and the chiral agent used in Specific Example 5) alone was injected, thereby manufacturing a cell. Polarizing plates were attached to the cell in the same manner as in Specific Example 5, thereby manufacturing a conventional STN liquid crystal display device. The electro-optical characteristics of this liquid crystal display device is taken as 100 to be used as a standard for the characteristics listed in Table 3 above.

Comparative Example 10

Into the same type of cell as that manufactured in Specific Example 5, the same type of a mixture as used in Specific Example 5 was injected. The thus manufactured cell was subjected to the UV-ray irradiation without using a photomask in the same manner as in Specific Example 5, thereby manufacturing a liquid crystal display device.

The electro-optical characteristics of the liquid crystal display device are listed in Table 3 above. The observation of the liquid-crystal display device found that a polymeric wall was formed within a pixel, which is assumed to be the reason for the decreased contrast.

Comparative Examples 11 and 12 and Specific Examples 6 and 7

Liquid crystal display devices of these examples were manufactured by using the same type of cell, a liquid crystal and a photopolymerization initiator as those used in Specific Example 5, and the UVray irradiation was also conducted in the same manner as in Specific Example 5. The composition ratio of the photopolymerizable material to be injected together with the liquid crystal and the photopolymerization initiator into the respective cells was, however, different from that of Specific Example 5 and is listed in Table 5 below. The electro-optical characteristics of the manufactured liquid crystal display devices are listed in Table 3 above.

TABLE 5

| | Composition ratio of the photopolymerizable material (wt %): | | | | |
| --- | --- | --- | --- | --- | --- |
| | Compound C | Compound D | p-phenyl-styrene | R-684 | Lauryl acrylate |
| Com. Example 11 | 0 | 0 | 10 | 5 | 85 |
| Com. Example 12 | 0 | 10 | 10 | 5 | 75 |
| Spec. Example 5 | 1.2 | 85 | 10 | 3.8 | 0 |
| Spec. Example 6 | 1.2 | 75 | 10 | 3.8 | 10 |
| Spec. Example 7 | 1.2 | 65 | 10 | 3.8 | 20 |

Further, the $\Delta n$ and the chiral pitch ($\mu m$) of each photopolymeric material after the polymerization are also listed in Table 4 above.

Specific Example 8 (Using a plastic substrate in a reflective type STN liquid crystal display device)

Figure 23:
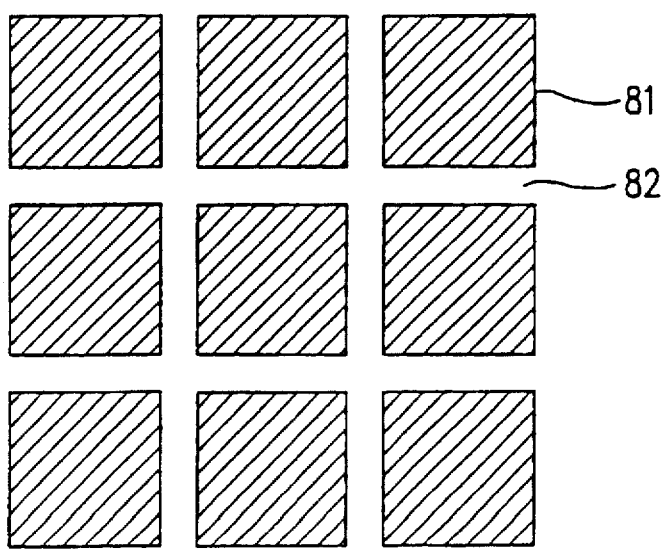
FIG. 23 is a diagram showing the configuration of reflecting plates in a substrate used in Specific Example 8.

Two acrylic plastic substrates each having a thickness of 400 $\mu m$ were subjected to the same alignment treatment as in Specific Example 5, and were attached to each other with a spacer having a diameter of 5.8 $\mu m$ interposed therebetween in the same manner as in Specific Example 5. The absorption curve of the plastic substrate is shown in FIG. 7 and the substrate substantially cuts light under 350 nm. One of the plastic substrates was provided with a reflecting plate having reflecting portions 81 in a matrix corresponding to pixels and a transparent portion 82 surrounding the reflecting portions 81 as shown in FIG. 23. The other substrate was provided with a color filter. Thus, a reflective type cell was manufactured. Since the cell included the transparent portion 82 between the reflecting plates 81, the effect of a photomask can be attained without using an actual photomask. In this system, the distance between the liquid crystal layer and the portion working as a photomask is smaller by the thickness of the substrate as in Specific Example 5. Therefore, a polymeric wall is prevented from being formed in a pixel due to the diffraction caused by the photomask, and production procedure can be simplified.

Next, a mixture including 0.009 g of the compound C (polymerizable chiral agent), 0.10 g of pphenyl styrene, 0.85 g of the compound D, 0.041 g of 1,4-butanediol dimethacrylate, 5 g of the liquid crystal material ZLI-4427 (manufactured by Merck & Co-, Ltd.; wherein the twist angel is previously adjusted to be 240° by adding S-811) and 0.025 g of a photopolymerization initiator Lucirin TPO (manufactured by BASF; exhibiting its largest absorption around 400 nm) was injected into the cell by vacuum injection at a pressure of 100 Pa, at a temperature of 30° C. and by raising the temperature of the substrates and the used injection plate up to 90° C. simultaneously with the start of the injection. The resultant cell was subjected to UV-ray irradiation (by using one light source through one substrate) through the reflecting plate at the same light intensity as in Specific Example 5 at a temperature of 90° C. for 3 minutes continuously. The cell was then cooled to a temperature of 25° C., and subjected to the UV-ray irradiation for another 7 minutes. The cell was heated up to a temperature of 100° C., and annealed to 25° C. over 8 hours. The retardation ($\Delta n_1 \cdot d_1$) of the thus manufactured liquid crystal cell was 650 nm. A polarizing plate and a phase plate ($\Delta n_2 \cdot d_2 = 350$ nm), e.g., a retardation film were attached to the cell in the relationship as shown in FIG. 8. Thus, a reflective type STN liquid crystal display device including one polarizing plate was produced. The display device manufactured in Specific Example 8 is a reflective type, which cannot be evaluated similarly to a transmissive type display device, and hence, the electro-optical characteristics of this display device are listed not in Table 4 but in Table 6 below.

TABLE 6

| Reflectance (%): | | | |
|---|---|---|---|
| Comparative Example 9 | Comparative Example 11 | Comparative Example 12 | Specific Example 8 |
| 100 | 68 | 65 | 165 | note: The reflectance is indicated as a ratio to that of the device of Comparative Example 9, whose reflectance is taken as 100.

The reflectance of the devices of Comparative Examples 11 and 12 listed in Table 6 was measured when each device included the same type of a reflecting plate as that used in Specific Example 8. As is understood from Table 6, the device of Specific Example 8 is bright because it contains only one polarizing plate. The reflectance was measured by using a ratio of a reflectance of light entering at an angle of 30° against the normal line of the liquid crystal display device to a reflectance of white light in the direction of the normal line. The observation of the thus manufactured liquid crystal display device found that the display was bright as compared with that of the device manufactured in Comparative Example 12 and that the brightness in the polymeric wall was improved.

Comparative Example 13

Into the same type of cell manufactured in Specific Example 9 described below, the liquid crystal material ZLI-4792 (manufactured by Merck & Co., Ltd.; wherein the twist angle was previously adjusted to be 90° by adding S-811) was injected, thereby manufacturing an ordinary TN liquid crystal display device.

When the liquid crystal display device was pressed with a pen, the display color was changed.

Specific Example 9 (A reflective type TN liquid crystal display device)

A pair of glass substrates each having a thickness of 1.1 mm and bearing striped transparent electrodes (eight electrodes/mm; an interval of 25 82 m) of ITO with a thickness of 2000 Å were coated with polyimide (AL4552; manufactured by Nippon Synthetic Chemical Industry, Co., Ltd.) by spin coating, and subjected to a rubbing treatment in one direction with a nylon cloth. The resultant substrates were attached to each other so that the alignment directions cross at 90° with a spacer having a diameter of 5 μm interposed therebetween, thereby manufacturing a cell. Then, 0.004 g of the compound C (polymerizable chiral agent), 0.10 g of p-phenyl styrene, 0.85 g of the compound D, 0.046 g of 1,4-butanediol methacrylate, 5 g of the liquid crystal material ZLI-4792 (manufactured by Merck & Co., Ltd.; wherein the twist angle was previously adjusted to be 90° by adding S-811) and 0.025 g of the photopolymerization initiator Irgacure 651 were homogeneously mixed. The obtained mixture was injected into the cell by pillary injection. The thus manufactured cell was irradiated with UV rays by using two high pressure mercury lamps emitting collimated light through the respective substrates in the same manner as in Specific Example 5.

Polarizing plates were attached to the resultant cell so that the polarization axes were matched with the rubbing direction, thereby manufacturing a transmissive type TN liquid crystal display device. The transmission of the liquid crystal display device under application of no voltage is listed in Table 7 together with that of an ordinary TN liquid crystal display device manufactured in Comparative Example 13 described above.

TABLE 7

| | Specific Example 9 | Comparative Example 13 |
|---|---|---|
| Transmission (%) | 93 | 97 |

It is understood from Table 7 that although the display device of Specific Example 9 includes a polymeric wall, it is as excellent as the ordinary display device including no polymeric wall in the transmission. Then, a reflecting plate was provided on the back face of each of these display devices, thereby manufacturing reflective type TN liquid crystal display devices. These display devises were found to be equally excellent in the reflectance under application of no voltage. When the display device of Specific Example 9 was pressed with a pen, the display color was little changed, while the display color was changed in pressing the display device of Comparative Example 13.

In order to check the tight attachment between the polymeric wall and the substrates, a portion in the shape of a square of 20 mm ×20 mm including the polymeric wall and the liquid crystal regions alone was cut out from the cell. The substrate attached to the polymeric wall was pulled, but could not be peeled off with ease. The same procedure was performed with regard to the cell of Comparative Example 13, but the substrate was peeled off while cutting the square portion.

Now, the characteristics and modification examples of the present invention will be described.
Display mode:

The present invention is applicable to various modes of liquid crystal display devices such as transmissive or reflective type TN, STN, ECB, FCL, and any of these modes including a pigment. As an application not utilizing the alignment regulating force on a substrate, a liquid crystal domain can be formed at random or radially. Further, the present invention is applicable to a display device achieving a wide viewing angle in which the liquid crystal molecules in each liquid crystal region are aligned radially or concentrically. Although the present invention is applicable to both the reflective type and the transmissive type, it is preferable to adopt the reflective type when used as a portable remote terminal because the reflective type requires no back light and consumes less power.
Production method:

In the present invention, it is preferable that the alignment regulating force on a substrate is effectively used and that a polymeric wall is formed substantially in a non-pixel portion. For this purpose, a mixture including liquid crystal, a photopolymerizable material (i.e., photopolymerizable liquid crystal and a polymerizable compound) and a photopolymerization initiator is injected between substrates that are previously subjected to an alignment treatment, and then, the resultant substrates are locally irradiated with UV rays so that the pixel is substantially shielded. It is not necessary to add the photopolymerization initiator to the mixture to be injected.

Through the UV-ray irradiation, the photopolymerizable material is polymerized into a polymeric material to form a polymeric wall in a portion irradiated with UV rays. The polymeric material pushes the liquid crystal to a portion not irradiated with UV rays. As a result, the polymeric wall is formed in an irradiated portion, while the liquid crystal region is formed in a portion not irradiated with UV rays. In order to effectively use the alignment regulating force on the substrate, a photopolymerizable material having liquid crystallinity is used as part or whole of the photopolymerizable material. Accordingly, the photopolymerization can be caused without spoiling the liquid crystallinity of the mixture Moreover, in order to attain more uniform alignment in the present invention, the mixture is injected between the substrates preferably at a temperature exceeding the isotropic temperature of the mixture, and the photopolymerization is preferably caused as follows: the UV-ray irradiation is intentionally provided with a regular intensity distribution to cause the photopolymerization in a regular pattern; and in order to allow the mixture to have liquid crystallinity, the temperature of the substrates is decreased so as to attain the nematic or smectic phase, and then the photopolymerization is begun. At this point, the smectic phase excellent in liquid crystallinity is preferably used because it is possible to remove the photopolymerizable material from the liquid crystal region by using the smectic phase liquid crystal.

Method for providing UV-ray intensity distribution:

In the present invention, how the UV-ray intensity distribution is provided is significant. It is preferable to make the UV-ray intensity distribution regular by using light intensity adjustment means such as the above-mentioned photomask, microlens and interference plate.

When a photomask is used, the photomask can be placed either inside or outside of the cell as far as it can cause a regular intensity distribution of UV rays. In disposing the photomask outside of the cell; it is impossible to attain a desirable UV-ray intensity distribution when the distance between the photomask and the cell is large. Accordingly, the photomask is preferably disposed in the vicinity of the mixture of the liquid crystal and the photopolymerizable material It is particularly preferable that a substantial photomask for cutting UV rays is disposed inside the cell because the photomask is in contact with the mixture in this case. Specific examples for providing the photomask inside the cell include the following: In a reflective type liquid crystal display device, only a portion of a reflecting plate corresponding to a pixel is allowed to have a reflecting function and a portion corresponding to a non-pixel portion is made transparent; in both a reflective type and a transmissive type liquid crystal display devices, a film that transmits visible light but cuts UV rays, such as a color filter and an organic polymer film, is formed on one of the substrates in a regular pattern in accordance with a desired intensity distribution. Further, it is not necessary that the irradiated portion has 100% intensity and the rest 0%. Therefore, it is possible to locally adjust the transmitted amount of UV rays by using a material that can be used as a transparent electrode such as ITO. Also in this case, the phase-separation between the liquid crystal and the photopolymerizable material can be effectively caused.

According to the study by the present inventors, it is preferred to make a weakly irradiated area (described below) larger than a pixel so as to extremely decrease the interface between the liquid crystal region and the polymeric wall within the pixel. Therefore, the light intensity adjustment means such as a photomask, which allows UV rays to irradiate the nonpixel portion alone, is preferred for the following reason: When an area that is weakly irradiated because of the shield by a light shielding portion of the photomask (weakly irradiated area) has a size smaller than 30% of that of a pixel, the size of the liquid crystal region to be formed is also smaller than 30% of that of the pixel. As a result, the interface between the liquid crystal region and the polymeric wall is too large in a pixel, thereby causing light scattering which largely decreases the contrast.

The weakly irradiated area can take any shape as far as it covers 30% or more of the area of a pixel so as to locally decrease the UV-ray intensity. Therefore, unlimited examples of the shape include a circle, a square, a trapezoid, a rectangular, a hexagon, a rhombus, the shape of a letter, a figure partitioned with a curve or a line, part of these shapes, a combination of these shapes, and a collection of these shapes each small in size. In practicing the present invention, one or more of these shapes is selected, but it is preferred to adopt merely one kind of shape in order to increase the uniformity of a liquid crystal droplet.

In the present invention, it is significant to align the liquid crystal regions regularly horizontally in accordance with the alignment of the pixels. Therefore, the location of the weakly irradiated area is important. It is preferred that the weakly irradiated areas are located in accordance with the pitch of the pixels so that one weakly irradiated area be provided in each pixel. It is possible to provide one weakly irradiated area to several pixels, and for example, each line of pixels or a group of several pixels can be provided with one weakly irradiated area. Moreover, the weakly irradiated areas are not necessary to be independent from one another and can be connected with one another at the ends thereof as far as an area for cutting UV rays most effectively has one of the above-mentioned shapes and aligned in the above-mentioned manner. When a pixel is large, it is possible to intentionally form a polymeric wall within a pixel. In this case, although the contrast is decreased, the supporting force against an external pressure is enhanced.

In addition, it is preferred to use a UV-ray source emitting light as collimated as possible. When the light is not collimated, UV rays enter non-irradiated areas to cause the photopolymerization of the polymerizable material within a pixel, thereby decreasing the contrast. When a photomask or the like is provided within the cell so as to be substantially in contact with the mixture of the liquid crystal and the photopolymerizable material, however, the light can be less collimated.

Roughness in the display:

In a conventional polymer dispersed liquid crystal display device, light scattering is caused on the interface between the liquid crystal region and the polymeric wall due to the difference in the refractive index therebetween. This light scattering is also caused in a non-scattering type liquid crystal display device, which includes large liquid crystal regions and requires a polarizing plate for the display. The light scattering causes a problem of roughness in the display. In the present invention, however, even the polymerizable material is partly in the same alignment state as the liquid crystalline state before and after the polymerization, and the liquid crystal and the photopolymerizable material or the photopolymerizable liquid crystal have approximately the same refractive index, resulting in decreasing the roughness in the display. For this purpose, it is preferable that the optical characteristics such as $\Delta n$, $n_e$, $n_o$ and the chiral pitch of the liquid crystal in the liquid crystal region are matched with those of the polymerizable material as well as possible.
Photopolymerizable liquid crystal:

In the present invention, polymerization is caused in a homogeneous mixture of a liquid crystal and a photopolymerizable material (polymerizable material having liquid crystallinity) to polymerize the photopolymerizable material in the liquid crystalline state between two substrates having been subjected to an alignment treatment, thereby causing phase-separation between the liquid crystal and the polymeric material. Accordingly, it is possible to form a polymeric wall on which the photopolymerizable liquid crystal is fixed, and hence, the polymeric wall can attain a similar alignment regulating force to that on the substrate. This results in that the liquid crystal molecules receive the alignment regulating force not only from the surface of the substrate but also from the surface of the polymeric wall. Therefore, the alignment of the liquid crystal molecules is stabilized, and in addition, the alignment of the liquid crystal molecules in the vicinity of the polymeric wall can be uniform. In the conventional method in which a polymeric wall is previously formed (disclosed in Japanese Laid-Open Patent Publication No. 61-502128 and the like), the alignment of the liquid crystal molecules in the vicinity of the polymeric wall is disordered, resulting in a difficulty in obtaining uniform display.

In this conventional method, uniform display cannot be obtained as described above. In addition, since the optical characteristics such as $\Delta n$, $n_e$, $n_o$ and the chiral pitch of the liquid crystal in the liquid crystal region are different from those of the polymeric material, the transmission under application of no voltage is decreased in the polymeric wall. Therefore, when such a device is used as a reflective type liquid crystal display device, the display is generally dark.

The photopolymerizable liquid crystal used in the present invention includes a polymerizable functional group in its molecule, and an example includes a compound represented by the following Formula 5:

A—B—LC$_1$ or

A—B—LC$_2$—B—A      Formula 5 wherein A indicates a polymerizable functional group having an unsaturated bond or having a heterocyclic ring structure with distortion such as epoxy such as CH$_2$=CH—, CH$_2$=CH—COO—, CH$_2$=CH—COO—,

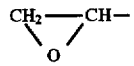

and —N=C=O; B indicates a coupling group for connecting the polymerizable functional group with a liquid crystalline compound such as an alkyl chain (—(CH$_2$)n—), an ester bond (—COO—), an ether bond (—O—), a polyethylene glycol chain (—CH$_2$CH$_2$O—) and a combination thereof; and LC$_1$ indicates a liquid crystalline compound such as a compound represented by the following Formula 6, a cholesterol ring or its derivatives:

D—E—G      Formula 6 wherein G indicates a polar group for allowing the dielectric constant anisotropy and the like of the liquid crystal to be exhibited such as a benzene ring, a cyclohexane ring, a paradiphenyl ring, a phenylcyclohexane ring, a terphenyl ring and a diphenylcyclohexane ring having a functional group such as —CN, —OCH$_3$, —F, —Cl, —OCF$_3$, —OCCl$_3$; E indicates a functional group for connecting D with G such as —CH$_2$—, —CH$_2$CH$_2$—, —O—, —C≡C—, —CH=CH—; and D indicates a functional group to be connected with B in Formula 5 such as a paraphenyl ring, a 1,10-diphenyl ring, a 1,4-cyclohexane ring and a 1,10-phenylcyclohexane ring. LC$_2$ in Formula 5 includes a rigid group such as a paraphenyl ring, a 1,10-diphenyl ring, a 1,4-cyclohexane ring and a 1, 10-phenylcyclohexane ring. Such a functional group can be used singly, or a plurality of them can be bonded with each other with a coupling group such as —CH$_2$CH$_2$—, —CH=CH—, —C≡C—, —COO—, —N=CH—, —O—, —N=N—and —COS—. The group indicated by D affects the dielectric constant anisotropy and the refractive index anisotropy of the liquid crystal molecules.

When the dielectric constant anisotropy of the liquid crystal used in the present liquid crystal display device is positive, the polar group indicated by G in Formula 6 is positioned so as to make the dielectric constant anisotropy $\Delta\varepsilon$ negative. Specifically, LC$_1$ includes 2-substitution product, 3-substitution product, 2,3-substitution product and the like of the benzene ring in the polar group G. When the dielectric constant anisotropy of the liquid crystal is negative, the polar group G is positioned so as to make the dielectric constant anisotropy $\Delta\varepsilon$ positive. Specifically, LC$_1$ includes 4-substitution product, 3,4,5 -substitution product, 3,4-substitution product and the like of the benzene ring in the group G. When the number of the substituent in the substitution product of the polar group is plural in one molecule, all the substituents are not required to be of the same kind. In both the cases where the dielectric constant anisotropy $\Delta\varepsilon$ is positive and it is negative, it is not necessary to use only one kind of polymerizable liquid crystal. Therefore, plural kinds of the polymerizable liquid crystal can be used together as far as at least one of the above-mentioned compounds is included.

Chiral agent:

In order to allow the polymeric wall to have a chiral pitch as in the liquid crystal region, the material for forming the polymeric wall, i.e., the photopolymerizable material, is required to include a material having an optical rotary power. Such a material is a compound including an optically inactive asymmetric carbon atom in its molecule and having the polymerizable portion described above with regard to the photopolymerizable liquid crystal. Further, it is preferable that the material has a rigid structure in the shape of a lot similarly to the photopolymerizable liquid crystal in order not to spoil the liquid crystallinity. The amount of the polymerizable chiral agent to be added to the mixture of the liquid crystal and the photopolymerizable material depends upon the kind of the photopolymerizable materials to be used together and the kind of photopolymerizable chiral agent. Therefore, the amount is not specified in the present invention. It is preferable, however, that the chiral agent is added so that the chiral pitch thereof be matched with the chiral pitch of the liquid crystal molecules in the liquid crystal region as well as possible.

Polymerizable material:

Examples of the photopolymerizable material to be polymerized through light irradiation include acrylic acid and acrylate having a long chain alkyl group with 3 or more carbon atoms or a benzene ring, such as isobutyl acrylate, stearyl acrylate, lauryl acrylate, isoamyl acrylate, n-butyl methacrylate, n-lauryl methacrylate, tridecyl methacrylate, 2-ethylhexyl acrylate, n-stearyl methacrylate, cyclohexyl methacrylate, benzyl methacrylate, 2-phenoxyethyl methacrylate, isobornyl acrylate, and isobornyl methacrylate. Further, in order to increase the physical strength of the polymeric wall, the following multi-functional compound having two or more functional groups can be used: R-684 (manufactured by Nippon Kayaku Co., Ltd.), bisphenol A dimethacrylate, bisphenol A diacrylate, 1,4-butanediol dimethacrylate, 1,6-hexanediol dimethacrylate, trimethylol propane trimethacrylate, trimethylol propane triacrylate, tetramethylol methane tetraacrylate, and neopentyl diacrylate. More preferably, a halogenated photopolymerizable compound, particularly, a chlorinated or fluorinated compound as follows can be used: 2,2,3,4,4,4-hexafluorobutyl methacrylate, 2,2,3,4,4,4-hexachlorobutyl methacrylate, 2,2,3,3-tetrafluoropropyl methacrylate, 2,2,3,3-tetrachloropropyl methacrylate, perfluorooctylethyl methacrylate, perchlorooctylethyl methacrylate, perfluorooctylethyl acrylate, and perchlorooctylethyl acrylate.

In the present invention, a polymeric wall is formed in a cell so as to prevent the variation of the cell thickness due to external pressure. Therefore, the glass transition temperature (Tg) is a significant factor in selecting the photopolymerizable material. When the glass transition temperature is lower than room temperature, the material is in the state like rubber at room temperature, and hence is transformed with ease by an external pressure. Therefore, such a material is not suitable to the present invention. The glass transition temperature of the photopolymerizable material to be used is preferably 0° C. or more, and more preferably 40° C. or more.

Polymerization inhibitor:

In order to form the liquid crystal region in accordance with the pattern of the used photomask, the rate of the polymerization is preferably low. When the polymerization rate is high, the polymerization is sufficiently caused in an area shielded by the photomask due to the light scattering and reflective on the substrate, thereby allowing the polymerizable material to be attached to the pixel. This results in the formation of the polymeric wall in the pixel. Specific examples of the polymerization inhibitor include styrene, the derivatives of styrene such as pfluorostyrene and paraphenylstyrene, and nitrobenzene.

Liquid crystal material:

The liquid crystal is not specified in the present invention because the optimal liquid crystal largely depends upon the display mode. For example, in the TN, STN and ECB modes, examples of the preferable material include an organic mixture exhibiting a liquid crystalline state around room temperature such as nematic liquid crystal (including liquid crystal for dual frequency drive; including liquid crystal having a dielectric constant anisotropy $\Delta\epsilon<0$) and nematic liquid crystal including cholesteric liquid crystal in terms of the characteristics thereof. More preferably, liquid crystal excellent in chemical reaction resistance is used because of the photopolymerization effected during the processing. Specific examples of such liquid crystals include those having a functional group such as a fluorine atom, for example, ZLI-4801-000, ZLI-4801-001, ZLI-4792 and ZLI-4427 (all manufactured by Merck & Co., Inc.). In selecting liquid crystal and a liquid crystalline compound having a polymerizable functional group in its molecule, it is preferred, from the viewpoint of miscibility, that the materials to be selected have similar portions for exhibiting the liquid crystalline characteristics. Particularly, when a fluoric or chloric liquid crystal, which has specific chemical characteristics, is used, it is preferred that the polymerizable liquid crystal to be used together is also a fluoric or chloric compound.

The refractive index of the liquid crystal is preferably $|(n_e$ or $n_o)-n_p|<0.1$, wherein $n_p$ indicates the refractive index of the polymeric material to be used together. The refractive index out of the aforementioned range causes mismatching in the refractive index, thereby increasing the roughness in the display. More preferably, $n_p$ takes a value between $n_e$ and $n_o$. When the refractive index of the liquid crystal is within this range, there is only a small difference in the refractive index between the polymeric wall and the liquid crystal region even under application of a voltage. Therefore, light scattering on the interface between the liquid crystal region and the polymeric wall is extremely decreased. In particular, the reflective index of the liquid crystal equal to $n_o$ is preferable because the black level under application of a voltage is improved.

Mixed ratio of the materials:

It is necessary to add the photopolymerizable material (including the polymerizable chiral agent) in such an amount that the mixture of the liquid crystal, the photopolymerization initiator and the photopolymerizable material can be in the liquid crystalline state. The amount to be added is not specified in this invention because the amount for exhibiting the liquid crystallinity depends upon the kind of materials. Preferably, the photopolymerizable liquid crystal is added to the photopolymerizable material by 30 wt % or more and 90 wt % or less. When the proportion of the photopolymerizable liquid crystal is below 30 wt%, a temperature range in which the mixture is in the liquid crystalline state becomes small, and hence it is impossible to sufficiently align the STN liquid crystal between the substrates. When the proportion exceeds 90 wt %, the elastic modulus of the photopolymeric material after the polymerization is too low to obtain sufficient strength for supporting the cell.

The weight ratio of the liquid crystal to the photopolymerizable material is preferably 50:50 through 97:3, and more preferably 70:30 through 90:10. When the proportion of the liquid crystal is below 50 wt %, the interaction between the polymeric wall and the liquid crystal is increased, and therefore, an extremely high voltage is required to drive the cell. Further, the size of the liquid crystal regions aligned in accordance with the alignment regulating force on the substrate is decreased. Thus, the resulting display device is not suitable for practical use. When the proportion of the liquid crystal exceeds 97 wt %, the physical strength of the polymeric wall is decreased, resulting in unstable performance of the display device.

Retardation (d·$\Delta n$):

Since the alignment of the liquid crystal region in the present liquid crystal display device is similar to that in an ordinary STN liquid crystal display device, the optimal retardation and the retardation of the phase plate are the same as those in the ordinary STN liquid crystal display device.

In a reflective type display device, the product $(d_1 \cdot \Delta n_1)$ of a cell thickness $d_1$ and $\Delta n_1$ of the liquid crystal is preferably in the range between 500 nm and 800 nm in terms of the contrast and coloring. A display device for colored display alone, however, can be changed into a device for black and white display by providing a substrate having a retardation film in a manner shown in FIG. 8. For this purpose, the product $(d_2 \cdot \Delta n_2)$ of the refractive index anisotropy $\Delta n_2$ of the substrate having the retardation film and the cell thickness $d_2$ is extremely significant, and is preferably in the range between 150 nm and 380 nm. In addition, $(d_1 \cdot \Delta n_1 - d_2 \cdot \Delta n_2)$ is preferably in the range between 450 nm and 550 nm. Further, the optical axis of the substrate having the retardation film and the alignment direction of the liquid crystal on the substrate are also significant. As shown in FIG. 8, when an angle between the alignment direction (rubbing direction) n of the liquid crystal on the upper electrode substrate (corresponding to the substrate 7 in FIG. 4) and the optical axis o of a phase plate, e.g., a retardation film (corresponding to the phase plate 13 in FIG. 4) is taken as an angle β, and the twist angle of the liquid crystal is taken as an angle θ (=240°), it is preferable that the relationship β= (θ−180)/2±10° is satisfied. Further, an angle a between the alignment direction n of the liquid crystal on the upper substrate and the polarization axis m of the polarizing plate is preferably 30±10°. Further, the twist angle θ0 is an angle between the alignment direction n of the liquid crystal in the vicinity of the upper electrode substrate and the alignment direction l of the liquid crystal in the vicinity of the other substrate having a reflecting function, and is preferably in the range between 220° and 290°. This range is also applicable to a transmissive type display device described below.

Figure 24:
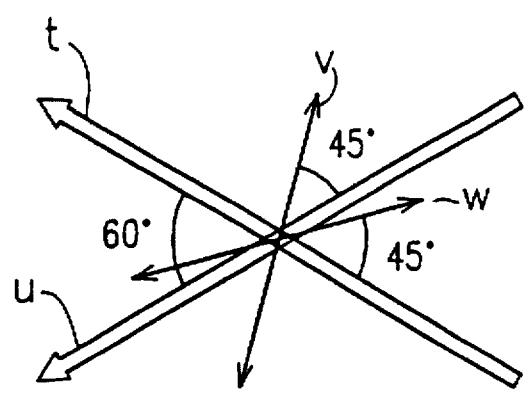
FIG. 24 shows optical axes of polarizing plates and a phase plate and the alignment direction of liquid crystal in a transmissive type liquid crystal display device.

FIG. 24 shows a preferable alignment direction of the liquid crystal and the like in a transmissive type display device including two polarizing plates sandwiching a cell. In FIG. 24, the alignment direction of the liquid crystal in the vicinity of the lower substrate is indicated as t, the alignment direction of the liquid crystal in the vicinity of the upper substrate is indicated as u, the polarization axis of the upper polarizing plate is indicated as v and the polarization axis of the lower polarizing plate is indicated as w. The relationship among the angles shown in FIG. 24 is merely an unlimited example in a transmissive type display device.

Photocolymerization initiator:

A photopolymerization initiator is not always required to be added to the mixture to be injected into a cell, but is preferably added thereto in order to effect the polymerization of the photopolymerizable material smoothly. Specific examples of the photopolymerization initiator (or a catalyst) includes Irgacure 184, Irgacure 651, Irgacure 907, Darocure 1173, Darocure 1116 and Darocure 2959. The amount of the polymerization initiator to be added is preferably 0.3%, or more and 5% or less of the entire mixture including liquid crystal and a polymerizable material for the following reason: When the mixed ratio is below 0.3%, the photopolymerization reaction cannot be sufficiently carried out. When the mixed ratio exceeds 5%, the rate of the phase-separation between the liquid crystal and the polymeric material is too fast to be controlled, and the thus formed liquid crystal region is so small that a higher driving voltage is required.

When a plastic substrate is used, UV rays are absorbed by the substrate, and hence the polymerization is difficult to carry out. Therefore, in such a case, it is preferred to use a photopolymerization initiator that absorbs visible light and can be polymerized by visible light. Specific examples of such a polymerization initiator include Lucrin TPO (manufactured by BASF), KYACURE DETX-S (manufactured by Nippon Kayaku Co., Ltd.) and CGI369 (manufactured by Ciba-Geigy Corporation).

Driving method:

The driving method applicable to the present invention is not specified but includes a simple matrix drive and an active matrix drive using TFTs, MIMs, and the like. With regard to an STN liquid crystal display device, however, the simple matrix drive is preferable in terms of the characteristics thereof.

Material for substrate:

As a material for a substrate, glass and a polymer film, which are examples of transparent solid, and an Si substrate, which is an example of opaque solid can be used. Further, for a reflective type display device, a substrate bearing a metal film can be also used.

As a plastic substrate, a preferable material that does not absorb visible light such as PET, an acrylic polymer, styrene or polycarbonate may be used.

Further, it is possible to use two different kinds of substrates selected from among the above examples can be used to form a cell. It is also possible to combine substrates having different thicknesses whether or not they are the same kind.

Input/output device:

In the present invention, it is possible to combine the aforementioned liquid crystal display device with an input/output device of a pressure sensitive system, an electrostatic induction system or an electromagnetic induction system. These systems will be described.

(1) Pressure sensitive system:

In this system, a transparent plastic sheet having uniform surface resistance is overlapped on glass with a small distance therebetween. Since the present liquid crystal display device has a resistance against external pressure, it is possible to use two thin plastic sheets, resulting in a thin input portion. Therefore, the thus produced liquid crystal display input/output device has a small parallax and can be easily operated.

(2) Electrostatic induction system:

In this system, the position of a point pressed with a pen is detected, as is shown in FIG. 13B, by using an electrostatic coupling between the electrode of a tablet panel 90, which is applied with a voltage for the detection, and the electrode at the tip of an entry pen 93. Also in this system, input is conducted through the upper surface of the liquid crystal display device, and hence an external pressure is applied to the liquid crystal display device. When the present liquid crystal display device is used as a liquid crystal display device 91, a protection panel or the like is not required to be disposed between the tablet panel 90 and the liquid crystal display device 91 of FIG. 13B because the present device has a sufficient resistance against an external pressure.

Figure 13C:
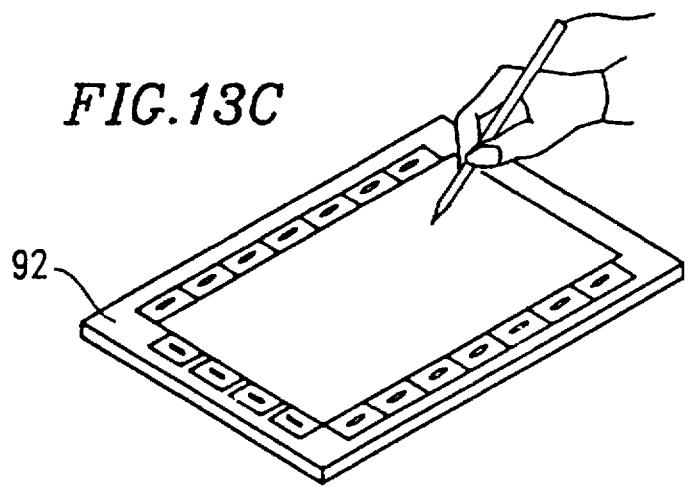

When the present liquid crystal display device is applied to a display integrated tablet 92, i.e., a liquid crystal display panel with a function of detecting pen position, as shown in FIG. 13C, in which the electrodes in the liquid crystal display panel are used for the display and the input by a timesharing system (reported in Sharp Technical Journal, No. 56, pp. 15–18), the liquid crystal display panel does not require a protection panel or the like for relaxing an external pressure. This results in a light and thin liquid crystal display panel.

The detailed descriptions of the input/output device can be found in Japanese Laid-Open Patent Publications Nos. 56-77884 and 5-53729. These documents are cited by the present application.

(3) Electromagnetic induction system:

In this system, an AC field generated by a coil in an entry pen is applied to a loop circuit for detecting a coordinate formed on a tablet panel, thereby determining the coordinate based on the position of a loop inducted by the voltage. In this system, the tablet can be positioned below a liquid crystal display panel, and hence a pallarax is hardly caused in the display of the liquid crystal display device. In the conventional liquid crystal display panel, however, a protection panel is required. The present liquid crystal display device has sufficient resistance against external pressure, and therefore, it is not necessary to provide a protection panel or the like for relaxing the external pressure.

As is described in detail above, in the present liquid crystal display device, which can adopt various conventionally used liquid crystal display modes such as TN, STN, FLC and a wide viewing angle mode, the polymeric wall constituting the display medium is tightly attached to the substrates. As a result, it is possible to prevent the cell thickness from being varied by an external pressure. Moreover, this liquid crystal display device is applicable to pen entry operation without using a protection film or the like. Therefore, it is possible to avoid a pallarax between the display and a pointed position due to the thickness of the protection film. Further, when a film substrate is used to form a cell, it is possible to provide a light STN liquid crystal display device in which the display quality is little varied by an external force and which is hardly damaged or transformed by an external force.

In addition, the electro-optical characteristics of the present liquid crystal display device rises sharply, and hence it is possible to attain a sufficient duty ratio. Accordingly, there is no need to use a TFT, resulting in decreasing the production cost.

The present liquid crystal display device can be used as a display suitable to a pen detective keyboard for a portable remote terminal, which is small in weight and consumes little power.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display input/output device comprising:
   a liquid crystal display device including a plurality of pixels and polymeric walls formed in a pattern between a pair of electrode substrates and liquid crystal regions at each pixel being surrounded by the polymeric walls and
   input means for detecting a position of a desired point by touching the desired point.

2. A liquid crystal display input/output device according to claim 1, wherein a plurality of liquid crystal domains are formed in a pixel, each of the liquid crystal domains including at least two areas having different alignment directions from each other.

3. A liquid crystal display input/output device according to claim 1, wherein the liquid crystal display device is one of a TN mode, an STN mode and an FLC mode.

4. A liquid crystal display input/output device according to claim 1, wherein the polymeric wall are tightly attached to the electrode substrates.

5. A liquid crystal display input/output device according to claim 1, wherein electrodes on the electrode substrates in the liquid crystal display device work as an input detection electrode in a liquid crystal display integrated tablet.

6. A liquid crystal display input/output device according to claim 1, wherein the input means adopts one of an electromagnetic induction system, an electrostatic induction system and a pressure sensitive system.

7. A liquid crystal display device according to claim 1, wherein said polymeric walls are formed of a cured photopolymerizable material which has been separated from a mixture including liquid crystal and a photopolymerizable material.

* * * * *